US011981095B2

(12) United States Patent
Achten et al.

(10) Patent No.: US 11,981,095 B2
(45) Date of Patent: May 14, 2024

(54) METHOD FOR PRODUCING AN AT LEAST PARTIALLY COATED OBJECT

(71) Applicant: Covestro Deutschland AG, Leverkusen (DE)

(72) Inventors: Dirk Achten, Leverkusen (DE); Thomas Büsgen, Leverkusen (DE); Thomas Michaelis, Leverkusen (DE); Roland Wagner, Leverkusen (DE); Bettina Mettmann, Dormagen (DE); Levent Akbas, Witten (DE); Jürgen Hättig, Odenthal (DE); Arnaud Guedou, Bailly Romainvilliers (FR)

(73) Assignee: Stratasys, Inc., Eden Prairie, MN (US)

( * ) Notice: Subject to any disclaimer, the term of this patent is extended or adjusted under 35 U.S.C. 154(b) by 804 days.

(21) Appl. No.: 16/463,510

(22) PCT Filed: Nov. 22, 2017

(86) PCT No.: PCT/EP2017/080037
§ 371 (c)(1),
(2) Date: May 23, 2019

(87) PCT Pub. No.: WO2018/095967
PCT Pub. Date: May 31, 2018

(65) Prior Publication Data
US 2019/0375153 A1    Dec. 12, 2019

(30) Foreign Application Priority Data
Nov. 25, 2016 (EP) ................................ 16200725

(51) Int. Cl.
| | | |
|---|---|---|
| *B29C 71/00* | (2006.01) | |
| *B29C 64/153* | (2017.01) | |
| *B33Y 40/20* | (2020.01) | |
| *B33Y 80/00* | (2015.01) | |
| *C08G 18/32* | (2006.01) | |
| *C08G 18/38* | (2006.01) | |
| *C08G 18/73* | (2006.01) | |
| *C08G 18/75* | (2006.01) | |
| *C08G 18/76* | (2006.01) | |
| *C08J 7/043* | (2020.01) | |

(Continued)

(52) U.S. Cl.
CPC ........ *B29C 71/0009* (2013.01); *B29C 64/153* (2017.08); *B33Y 40/20* (2020.01); *C08G 18/3228* (2013.01); *C08G 18/3234* (2013.01); *C08G 18/3857* (2013.01); *C08G 18/73* (2013.01); *C08G 18/755* (2013.01); *C08G 18/7671* (2013.01); *C08J 7/043* (2020.01); *C08J 7/046* (2020.01); *C08J 7/056* (2020.01); *B29K 2075/00* (2013.01); *B33Y 80/00* (2014.12); *C08J 2375/04* (2013.01); *C08J 2433/10* (2013.01)

(58) Field of Classification Search
CPC .... C08G 18/10; C08G 18/12; C08G 18/3228; C08G 18/3234; C08G 18/3857; C08G 18/0828; C08G 18/2825; C08G 18/283; C08G 18/3206; C08G 18/4018; C08G 18/4238; C08G 18/44; C08G 18/4808; C08G 18/4854; C08G 18/664; C08G 18/73; C08G 18/755; C08G 18/7671; C08J 2375/04; C08J 2433/10; C08J 7/043; C08J 7/04; C08J 7/046; C08J 7/056; C09D 175/06; C09D 175/08; B29K 2075/00; B29C 71/00; B29C 71/0009; B29C 64/118; B29C 64/153; B33Y 40/20

See application file for complete search history.

(56) References Cited

U.S. PATENT DOCUMENTS

| | | |
|---|---|---|
| 4,946,535 A | 8/1990 | Meckel et al. |
| 6,100,326 A | 8/2000 | Richter et al. |

(Continued)

FOREIGN PATENT DOCUMENTS

| | | |
|---|---|---|
| CA | 2253119 A1 | 5/1999 |
| CN | 104559140 A | 4/2015 |

(Continued)

OTHER PUBLICATIONS

Mireles et al. ("Analysis of Sealing Methods for FDM-fabricated Parts", Proceeding from Solid Free-form Fabrication Symposium, 185-196, Austin, TX, Aug. 2011 (Year: 2011).*

(Continued)

*Primary Examiner* — Yunju Kim
(74) *Attorney, Agent, or Firm* — Faegre Drinker Biddle & Reath LLP

(57) ABSTRACT

The invention relates to a method for producing an at least partially coated object, comprising the step of producing the object from a construction material by means of an additive manufacturing method, the construction material comprising a thermoplastic polyurethane material. Following the production of the object, the method comprises the step of at least partially bringing a preparation into contact with the object, the preparation being selected from: an aqueous polyurethane dispersion; an aqueous dispersion of a polymer comprising OH groups, this dispersion also containing a compound comprising NCO groups; an aqueous preparation of a compound containing NCO groups, but not containing any polymers comprising OH groups; or a combination of at least two thereof. The invention also relates to an at least partially coated object that was obtained by a method according to the invention.

15 Claims, No Drawings

(51) Int. Cl.
  *C08J 7/046* (2020.01)
  *C08J 7/056* (2020.01)
  *B29K 75/00* (2006.01)

(56) References Cited

U.S. PATENT DOCUMENTS

| | | | |
|---|---|---|---|
| 6,426,414 | B1 | 7/2002 | Laas et al. |
| 6,767,958 | B2 | 7/2004 | Laas et al. |
| 9,643,359 | B2 | 5/2017 | Baumann et al. |
| 2004/0259970 | A1 | 12/2004 | Lockhart et al. |
| 2006/0141234 | A1 | 6/2006 | Rearick et al. |
| 2006/0159896 | A1 | 7/2006 | Pfeifer et al. |
| 2007/0020463 | A1 | 1/2007 | Trainham |
| 2007/0132158 | A1 | 6/2007 | Martinoni et al. |
| 2009/0092647 | A1 | 4/2009 | Schoenberger et al. |
| 2009/0286950 | A1* | 11/2009 | Schumann ............ C08G 18/283 264/211 |
| 2013/0144007 | A1* | 6/2013 | Zastrow ............. C08G 18/0828 524/591 |
| 2013/0273375 | A1* | 10/2013 | Achten ................ C08G 18/706 156/227 |
| 2016/0251486 | A1* | 9/2016 | Cernohous ........... B29C 48/022 264/308 |
| 2017/0129177 | A1 | 5/2017 | Hättig et al. |

FOREIGN PATENT DOCUMENTS

| | | | | |
|---|---|---|---|---|
| DE | 2446440 | A1 | 4/1976 | |
| DE | 2901774 | A1 | 7/1980 | |
| DE | 10313452 | A1 | 1/2004 | |
| DE | 102004020452 | A1 | 12/2005 | |
| EP | 0192946 | A1 | 9/1986 | |
| EP | 916647 | A2 | 5/1999 | |
| EP | 928799 | A1 | 7/1999 | |
| EP | 0959087 | B1 | 10/2003 | |
| EP | 1648686 | A1 * | 4/2006 | ........... B29C 64/153 |
| EP | 2772917 | A1 | 9/2014 | |
| GB | 1462597 | A | 1/1977 | |
| WO | WO-0188006 | A1 | 11/2001 | |
| WO | WO-2015197515 | A1 | 12/2015 | |
| WO | WO-2016030490 | A1 | 3/2016 | |

OTHER PUBLICATIONS

International Search Report for PCT/EP2017/080037 dated Feb. 9, 2018.
Written Opinion of the International Searching Authority for PCT/EP2017/080037 dated Feb. 9, 2018.
Zhu et al., "Water-based coatings for 3D printed parts," Journal of Coatings Technology and Research, vol. 12, 2015, pp. 889-897.
Rust-Oleum Corporation, Safety Data Sheet for Profin 1-GL 4PK WB Poly 275VOC Gloss, Feb. 12, 2019, 5 pages.
Rust-Oleum Corporation, Safety Data Sheet for Profin 1-GL 4PK WB Poly 275VOC Satin, Feb. 14, 2019, 5 pages.
Rust-Oleum Corporation, Safety Data Sheet for Profin 1-GL 4PK WB Poly 275VOC Semi Glos, May 18, 2015, 6 pages.

* cited by examiner

METHOD FOR PRODUCING AN AT LEAST PARTIALLY COATED OBJECT

CROSS-REFERENCE TO RELATED APPLICATIONS

This application is a national stage application (under 35 U.S.C. § 371) of PCT/EP2017/080037, filed Nov. 22, 2017, which claims benefit of European Application No. 16200725.6, filed Nov. 25, 2016, both of which are incorporated herein by reference in their entirety.

The present invention relates to a process for producing an at least partially coated article comprising the step of producing the article by means of an additive manufacturing process from a construction material, wherein the construction material comprises a thermoplastic polyurethane material. The invention further relates to an at least partially coated article obtained by a process according to the invention.

It is known to produce plastics articles in an additive manufacturing process, for example in a powder sintering process, wherein the articles are constructed layerwise. The additive manufacturing processes are also known as 3D printing. Employable starting materials for the articles to be produced in a 3D printing process include for instance polyamides or thermoplastic polyurethane. The use of such plastics for the production of plastics articles in a 3D printing process has the disadvantage that the surface of the articles is porous and therefore on the one hand is subject to elevated wear and on the other hand is comparatively susceptible to adhesion of dirt due to its porous surface structure. The aesthetics of the article may therefore be significantly impaired. The porous surface of the articles may moreover have a negative effect on haptics. Depending on the printed material used the articles may moreover absorb water or moisture which can negatively affect the structure and/or the stability of the articles.

In order to at least partially eliminate the porous surface of such articles it is known in the prior art to grind and/or polish the surface of the plastics articles. These can indeed make the surface of the plastics articles smoother. However, largely removing the pores is possible only with considerable effort so that generally, even after polishing, it cannot be guaranteed that no dirt remains adhering to the surface. However, a polishing of the surface is not possible in every case. Since polishing effects material removal from the surface, the geometry of the article may be altered which is unwanted in some cases. In addition, even a polishing of the surface cannot ensure that said surface is fluid repellent, in particular water repellent, and watertight. However, depending on the material used in the manufacture of such plastics articles, a water repellent or watertight character of the surface is sought.

WO 2016/030490 A1 discloses a process for impregnating moldings produced in a 3D printing process, in particular in a powder-based manufacturing/printing process, with a liquid and/or sprayable impregnating agent, wherein the impregnating agent comprises 25% to 95% by weight of a solvent or solvent mixture and a balance to 100% by weight of proportions of a plastic or plastics mixture dissolvable in the solvent or solvent mixture in each case based on the total composition of the impregnating agent and wherein the impregnating agent is applied to the surface of the molding to be impregnated and after application of impregnating agent the impregnated surface is dried. However, the disadvantage here is the use of a solvent which should be avoided for reasons of environmental protection.

The publication "Water-based coatings for 3D printed parts" by Jiayi Zhu, Julia L. Chen, Robert K. Lade Jr., Wieslaw J. Suszynski and Lorraine F. Francis in J. Coat. Technol. Res., 12 (5) 889-897, 2015 (DOI 10.1007/s11998-015-9710-3) describes the production of test specimens using FDM processes (fused deposition modeling) with acrylonitrile-butadiene-styrene copolymer (ABS) as the building material. These test specimens were coated with two commercially available polyurethane dispersions. However, due to the chemical dissimilarity of the ABS substrate to a polyurethane coating, the strength of adhesion of the coating to such substrates is questionable.

It is an object of the present invention to at least partially overcome at least one disadvantage of the prior art. It is a further object of the present invention to specify an integrated additive production process with which the haptics of the produced article are improved while simultaneously improving the adhesion of its coating. It is yet a further object of the invention to be able to produce an article in a manner which is as cost efficient and/or individualized and/or resource-saving as possible.

The object is achieved in accordance with the invention by a process as claimed in claim 1. An at least partially coated articled obtained by a process according to the invention is specified in claim 15. Advantageous developments are specified in the subsidiary claims. They may be combined as desired, unless the opposite is apparent from the context.

A process for producing an at least partially coated article comprising the step of producing the article by means of an additive manufacturing process from a construction material, wherein the construction material comprises a thermoplastic polyurethane material, is characterized in that after the production of the article the process further comprises the step of:

at least partially contacting the article with a preparation selected from:
    aqueous polyurethane dispersion,
    aqueous dispersion of an OH-containing polymer, wherein this dispersion further contains an NCO-containing compound,
    aqueous preparation of an NCO-containing compound, wherein this preparation contains no OH-containing polymers,
    or a combination of at least two of these.

A combination of at least two of the recited preparations is to be understood as meaning either a mixture of at least two of the recited dispersions or aqueous preparations or a sequence of contactings of the article with the different selected preparations.

The additive manufacturing process may be selected from for example melt layering (fused filament fabrication, FFF, or fused deposition modeling, FDM), inkjet printing, photopolymer jetting, selective laser sintering, selective laser melting, hinder jetting-based additive manufacturing, multijet fusion-based additive manufacturing, high speed sintering process and laminated object modeling. It is preferable when the additive manufacturing process is a sintering process.

In the context of the present invention, sintering processes are processes which in particular utilize thermoplastic powders to construct articles in layerwise fashion. In these, a so-called coater applies thin layers of powder which are then selectively melted using an energy source. The surrounding powder supports the component geometry. Complex geometries can thus be manufactured more economically than in the FDM method. Moreover, different articles may be arranged or manufactured in a tightly packed manner in the so-called powder bed. Owing to these advantages, powder-based additive manufacturing processes are among the most economically viable additive manufacturing processes on the market. They are therefore the processes that are predominantly used by industrial users. Examples of powder-based additive manufacturing processes are so-called selective laser sintering (SLS) or high-speed sintering (HSS). They differ from one another in the method for introducing into the plastic the energy for the selective melting. In the laser sintering process energy input is effected via a deflected laser beam. In so-called high-speed sintering (HSS) processes energy input is effected via infrared (IR) radiators in combination with an IR absorber selectively printed into the powder bed. So-called selective heat sintering (SHS) utilizes the printing unit of a conventional thermal printer to selectively melt thermoplastic powders. Preference is given to selective laser sintering methods (SLS).

The thermoplastic polyurethane material is preferably elastic, i.e. has a breaking elongation in the tensile test according to DIN 53504 of ≥50%. In addition, the material may have for example a compression set after 25% compression (DIN 53517) of ≤10% absolute.

The thermoplastic polyurethane material may also contain further additives such as fillers, stabilizers and the like, but also further polymers. The total content of additives in the elastic polymer may be for example ≥0.1% by weight to ≤70% by weight, preferably ≥1% by weight to ≤30% by weight.

In the process according to the invention the article is at least partially contacted with a preparation after its production. The contacting may be effected by immersing, brush application, spraying or other known application methods for aqueous dispersions. A drying of the article after the contacting step may be carried out for example at room temperature (20° C.), at elevated temperature and optionally with vacuum assistance. Drying removes the water in the preparation. The preparation is preferably free of organic solvents.

The preparation may be an aqueous polyurethane dispersion. These comprise particles of a polyurethane polymer dispersed in an aqueous phase. Such dispersions are also known as one-component or 1K dispersions. By drying the dispersion, a coalescence of the particles and thus a film formation can take place. Any known aqueous polyurethane dispersions are in principle employable here. However, anionically hydrophilized and anionic/nonionically hydrophilized polyurethane dispersions are preferred.

The preparation may further contain an aqueous dispersion of an OH-containing polymer, wherein this dispersion further contains an NCO-containing compound. Such preparations are also known as two-component or 2K dispersions. A reaction between the polymer and the NCO-containing compound takes place here, thus affording a cured polymer film in the dried state. The NCO-containing compound may be for example an optionally hydrophilized diisocyanate, triisocyanate or an at least difunctional, NCO-terminated prepolymer.

The preparation may also be an aqueous preparation of an NCO-containing compound, wherein this preparation contains no OH-containing polymers. Such a preparation may also be referred to as an aqueous preparation of a hydrophilized isocyanate, wherein in contrast to a 2K polyurethane dispersion the polymer component for reaction with the NCO groups is absent. When using such a preparation it is intended that the hydrophilized isocyanate reacts with reaction partners on the surface of the construction material.

Such preparations find use inter alia as crosslinker components for water-dilutable two-component polyurethane lacquers (2K-PUR lacquers). Examples thereof are nonionic polyisocyanates hydrophilized using polyethers. Also known in addition to the purely nonionically hydrophilized, polyurethane-containing polyisocyanates are polyether-modified water-dispersible polyisocyanates which to improve emulsifiability or to achieve special effects additionally contain ionic groups, for example sulfonate groups or amino/ammonium groups.

The preparation may contain further additives. Silicone-containing surface-active additives in particular may be concerned.

Employing the recited preparations or combinations thereof avoids the problems associated with organic solvents. The material deriving from the preparation and the material of the article are both selected from polyurethanes or isocyanates and good compatibility may therefore be expected. The adhesion of the coating is then also better than for chemically less related materials.

A polyurethane film adhering to the object improves the haptic sensation elicited by the article not only by smoothing unevennesses in the article surface. Loose particles adhering to the surface such as may remain present in particular after powder sintering processes are bound into the film layer and thus fixed. Especially the auxiliaries employed in powders intended for sintering to improve flow and absorption properties such as $TiO_2$, carbon black or $SiO_2$ are fixed. This avoids difficulties associated with their use. Examples thereof are dusting or chalking of the surface and possible skin irritations from loose particles. Smooth, non-chalking surfaces are obtainable for the article. Any pores in the article are also at least partially filled.

Without wishing to be bound to a particular theory it is further thought that a polyurethane film adhering to the article may also absorb at least some of the mechanical forces acting on the article, in particular tensile forces, and thus contribute to an elevated strength of the article. In the regions contacted by the polyurethane dispersion after drying of the dispersion the article can undergo an enhancement in toughness and/or hardness of for example ≥2 or ≥5 Shore A hardness grades and for an enhancement in elastic modulus of >5%, preferably >10%. The abrasion resistance of these regions can likewise be increased.

The process according to the invention further makes it possible to achieve in the regions contacted by the preparation after drying of the dispersion an increase in the density of the processed construction material of for example ≥5% or ≥10%.

In a preferred embodiment the aqueous polyurethane dispersion is anionically and/or nonionically hydrophilized. It is preferable when the aqueous polyurethane dispersions are hydrophilized anionically by means of sulfonate groups and/or carboxylate groups. It is particularly preferable when exclusively sulfonate groups are present for anionic hydrophilization.

In a further preferred embodiment the aqueous polyurethane dispersion is obtainable when
  A) isocyanate-functional prepolymers are produced from
    A1) organic polyisocyanates
    A2) polymeric polyols having number-average molecular weights of 400 to 8000 g/mol, preferably of 400 to 6000 g/mol and particularly preferably of 600 to 3000 g/mol, and OH functionalities of 1.5 to 6, preferably of 1.8 to 3, particularly preferably of 1.9 to 2.1, and
    A3) optionally hydroxyl-functional compounds having molecular weights of 62 to 399 g/mol and A4) optionally isocyanate-reactive, anionic or potentially anionic and/or optionally nonionic hydrophilization agents, optionally in the presence of urethanization catalysts and optionally further assistant and additive substances and B) the free NCO groups thereof are then wholly or partially reacted B1) optionally with amino-functional compounds having molecular weights of 32 to 400 g/mol and B2) with amino-functional, anionic or potentially anionic hydrophilization agents by chain extension and the prepolymers are dispersed in water before, during or after step B).

Isocyanate-reactive groups are for example primary and secondary amino groups, hydroxyl groups or thiol groups.

It is further preferable when these polyurethane dispersions comprise less than 5% by weight, particularly preferably less than 0.2% by weight, based on the total dispersions of unbonded organic amines or of ammonia.

If desired the prepolymer A) may be wholly or partially converted into the anionic form by admixture of a base before, during or after the dispersing.

In order to achieve an anionic hydrophilization it is necessary to employ in A4) and/or B2) hydrophilization agents having at least one NCO-reactive group such as amino, hydroxyl or thiol groups and additionally —COO⁻, —SO₃⁻ or —PO₃⁻ as ionic groups or their wholly or partially protonated acid forms as potentially anionic groups.

Preferably employed in A4) and/or B2) as compounds for anionic or potentially anionic hydrophilization are those having exclusively sulfonic acid or sulfonate groups (—SO₃H or —SO₃M, where M=alkali metal or alkaline earth metal) as anionic or potentially anionic functionality.

Suitable polyisocyanates of component A1) are the aliphatic, aromatic or cycloaliphatic polyisocyanates having an NCO functionality of not less than 2 that are known per se to those skilled in the art.

Examples of such suitable polyisocyanates are 1,4-butylene diisocyanate, 1,5-pentamethylene diisocyanate, 1,6-hexamethylene diisocyanate (HDI), isophorone diisocyanate (IPDI), 2,2,4- and/or 2,4,4-trimethylhexamethylene diisocyanate, the isomeric bis(4,4'-isocyanatocyclohexyl) methanes or their mixtures of any desired isomer content, 1,4-cyclohexylene diisocyanate 4-isocyanatomethyl-1,8-octane diisocyanate (nonane triisocyanate), 1,4-phenylene diisocyanate, 2,4- and/or 2,6-tolylene diisocyanate, 1,5-naphthylene diisocyanate, 2,2'- and/or 2,4'- and/or 4,4'-diphenylmethane diisocyanate, 1,3- and/or 1,4-bis(2-isocyanate-prop-2-yl)benzene (TMXDI), 1,3-bis(isocyanatomethyl)benzene (XDI) and alkyl 2,6-diisocyanatohexanoates (lysine diisocyanates) having $C_1$-$C_8$-alkyl groups.

Employable in addition to the abovementioned polyisocyanates are modified diisocyanates having a functionality ≥2 and a uretidione, isocyanurate, urethane, allophanate, biuret, iminooxadiazinedione or oxadiazinetrione structure and also mixtures thereof also pro rata.

Preferably concerned are polyisocyanates or polyisocyanate mixtures of the abovementioned type having exclusively aliphatically or cycloaliphatically bonded isocyanate groups or mixtures thereof and an average NCO functionality of the mixture of 2 to 4, preferably of 2 to 2.6 and particularly preferably of 2 to 2.4

The use of preferably aliphatic isocyanate makes it possible to additionally protect the impregnated 3D printed polyurethanes against weathering and yellowing.

Particularly preferably employed in A1) are pentamethylene diisocyanate, hexamethylene diisocyanate, isophorone diisocyanate or the isomeric bis(4,4'-isocyanatocyclohexyl) methanes and also mixtures of the abovementioned diisocyanates.

Employed in A2) are polymeric polyols having a number-average molecular weight Mn of 400 to 8000 g/mol, preferably of 400 to 6000 g/mol and particularly preferably of 600 to 3000 g/mol. Said polymeric polyols preferably have an OH functionality of 1.5 to 6, particularly preferably of 1.8 to 3, very particularly preferably of 1.9 to 2.1.

Such polymeric polyols are the polyester polyols, polyacrylate polyols, polyurethane polyols, polycarbonate polyols, polyether polyols, polyester polyacrylate polyols, polyurethane polyacrylate polyols, polyurethane polyester polyols, polyurethane polyether polyols, polyurethane polycarbonate polyols and polyester polycarbonate polyols that are known per se in polyurethane lacquer technology. These may be employed in A2) individually or in any desired mixtures with one another.

In one particular embodiment these obtainable polyurethanes may also contain unsaturated double bonds amenable to a subsequent free-radical crosslinking reaction. Preferred for the construction thereof are monohydroxyl-functional, (meth)acrylate-containing alcohols. Such monohydroxyl-functional, (meth)acrylate-containing alcohols are for example 2-hydroxyethyl (meth)acrylate, caprolactone-extended modifications of 2-hydroxyethyl (meth)acrylate, 2-hydroxypropyl (meth)acrylate, 4-hydroxybutyl (meth)acrylate, 3-hydroxy-2,2-dimethylpropyl (meth)acrylate, the on average monohydroxyl-functional di-, tri- or penta(meth)acrylates of polyhdric alcohols such as trimethylolpropane, glycerol, pentaerythritol, ditrimethylolpropane, dipentaerythritol, ethoxylated, propoxylated or alkoxylated trimethylolpropane, glycerol, pentaerythritol, ditrimethylolpropane, dipentaerythritol or technical mixtures thereof.

Suitable polyester polyols also include the known-per-se polycondensates of di- and optionally tri- and tetraols and di- and optionally tri- and tetracarboxylic acids or hydroxycarboxylic acids or lactones. Also employable for producing the polyesters instead of the free polycarboxylic acids are the corresponding polycarboxylic anhydrides or corresponding polycarboxylic esters of lower alcohols.

Examples of suitable dials are ethylene glycol, butylene glycol, diethylene glycol, triethylene glycol, polyalkylene glycols such as polyethylene glycol and also 1,2-propanediol, 1,3-propanediol, 1,3-butanediol, 1,4-butanediol, 1,6-hexanediol and isomers, neopentyl glycol or neopentyl glycol hydroxypivalate, wherein 1,6-hexanediol and isomers, 1,4-butanediol, neopentyl glycol and neopentyl glycol hydroxypivalate are preferred. In addition, it is also possible to use polyols such as trimethylolpropane, glycerol, erythritol, pentaerythritol, trimethylolbenzene or trishydroxyethyl isocyanurate. Employable dicarboxylic acids include phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, 2-methylsuccinic acid, 3,3-diethylglutaric acid and/or 2,2-dimethylsuccinic acid. Acid sources that may be used further include the corresponding anhydrides.

Provided that the average functionality of the polyol to be esterified is greater than 2 it is also possible to use monocarboxylic acids such as benzoic acid and hexanecarboxylic acid.

Preferred acids are aliphatic or aromatic acids of the abovementioned type. Particularly preferred are adipic acid, isophthalic acid and phthalic acid. Hydroxycarboxylic acids that may be co-used as reaction participants in the production of a polyester polyol having terminal hydroxyl groups are for example hydroxycaproic acid, hydroxybutyric acid, hydroxydecanoic acid, hydroxystearic acid and the like. Suitable lactones are caprolactone, butyrolactone and homologs. Preference is given to caprolactone.

Also employable in A2) are hydroxyl-containing polycarbonates, preferably polycarbonate diols, having number-average molecular weights Mn of 400 to 8000 g/mol, preferably of 600 to 3000 g/mol. These are obtainable by reaction of carbonic acid derivatives, such as diphenyl carbonate, dimethyl carbonate or phosgene, with polyols, preferably dials.

Examples of such diols are ethylene glycol, 1,2- and 1,3-propanediol, 1,3- and 1,4-butanediol, 1,6-hexanediol, 1,8-octanediol, neopentyl glycol, 1,4-bishydroxymethylcyclohexane, 2-methyl-1,3-propanediol, 2,2,4-trimethylpentane-1,3-diol, dipropylene glycol, polypropylene glycols, dibutylene glycol, polybutylene glycols, bisphenol A, and lactone-modified diols of the abovementioned type.

It is preferable when the diol component contains 40% to 100% by weight of hexanediol, wherein 1,6-hexanediol and/or hexanediol derivatives are particularly preferred. Such hexanediol derivatives based on hexanediol comprise not only terminal OH groups but also ester groups or ether groups. Such derivatives are obtainable by reaction of hexanediol with excess caprolactone or by etherification of hexanediol with itself to afford di- or trihexylene glycol.

Instead of or in addition to pure polycarbonate dials, polyether-polycarbonate diols may also be used in A2).

Hydroxyl-containing polycarbonates are preferably linear. Polyether polyols are likewise employable in A2). Suitable are for example the polytetramethylene glycol polyethers known per se in polyurethane chemistry such as are obtainable by polymerization of tetrahydrofuran by means of cationic ring opening.

Likewise suitable polyether polyols are the addition products, known per se, of styrene oxide, ethylene oxide, propylene oxide, butylene oxide and/or epichlorohydrin onto di- or polyfunctional starter molecules. Polyether polyols based on the at least proportional addition of ethylene oxide onto di- or polyfunctional starter molecules can also be used as component A4) (nonionic hydrophilizing agents).

Employable suitable starter molecules include all prior art compounds, for example water, butyldiglycol, glycerol, diethylene glycol, trimethylolpropane, propylene glycol, sorbitol, ethylenediamine, triethanolamine, butane-1,4-diol.

Preferred components in A2) are polytetramethylene glycol polyethers and polycarbonate polyols or mixtures thereof, polytetramethylene glycol polyethers being particularly preferred.

Employable in A3) are polyols of the recited molecular weight range having up to 20 carbon atoms, such as ethylene glycol, diethylene glycol, triethylene glycol, 1,2-propanediol, 1,3-propanediol, 1,4-butanediol, 1,3-butylene glycol, cyclohexanediol, 1,4-cyclohexanedimethanol, 1,6-hexanediol, neopentyl glycol, hydroquinone dihydroxyethyl ether, bisphenol A (2,2-bis(4-hydroxyphenyl)propane, hydrogenated bisphenol A, (2,2-bis(4-hydroxycyclohexyl)propane), trimethylolpropane, glycerol, trimethylolethane, pentaerythritol and also any desired mixtures thereof with one another. Also suitable are esterdiols of the recited molecular weight range such as α-hydroxybutyl ε-hydroxycaproate, ω-hydroxyhexyl γ-hydroxybutyrate, β-hydroxyethyl adipate or bis(β-hydroxyethyl) terephthalate.

Also employable in A3) are monofunctional isocyanate-reactive hydroxyl-containing compounds. Examples of such monofunctional compounds are ethanol, n-butanol, ethylene glycol monobutyl ether, diethylene glycol monomethyl ether, diethylene glycol monobutyl ether, propylene glycol monomethyl ether, dipropylene glycol monomethyl ether, tripropylene glycol monomethyl ether, dipropylene glycol monopropyl ether, propylene glycol monobutyl ether, dipropylene glycol monobutyl ether, tripropylene glycol monobutyl ether, 2-ethylhexanol, 1-octanol, 1-dodecanol, 1-hexadecanol.

Suitable ionically or potentially ionically hydrophilizing compounds corresponding to the definition of the component A4) are for example mono- and dihydroxycarboxylic acids, mono- and dihydroxysulfonic acids and also mono- and dihydroxyphosphonic acids and salts thereof such as dimethylolpropionic acid, dimethylolbutyric acid, hydroxypivalic acid, malic acid, citric acid, glycolic acid, lactic acid, the propoxylated adduct of 2-butenediol and $NaHSO_3$, for example described in DE-A 2 446 440 (pages 5-9, formulae I-III).

Suitable nonionically hydrophilizing compounds of component A4) are for example polyoxyalkylene ethers having at least one hydroxyl, amino or thiol group. Examples are the monohydroxyl-functional polyalkylene oxide polyether alcohols having a statistical average of 5 to 70, preferably 7 to 55, ethylene oxide units per molecule, such as are obtainable in a manner known per se by alkoxylation of suitable starter molecules (described, for example, in Ullmanns Encyclopädie der technischen Chemie, 4th edition, volume 19, Verlag Chemie, Weinheim p. 31-38). These are either pure polyethylene oxide ethers or mixed polyalkylene oxide ethers and they contain at least 30 mol %, preferably at least 40 mol %, based on all alkylene oxide units present, of ethylene oxide units.

Particularly preferred nonionic compounds are monofunctional mixed polyalkylene oxide polyethers comprising 40 to 100 mol %> of ethylene oxide units and 0 to 60 mol %> of propylene oxide units.

Suitable starter molecules for such nonionic hydrophilizing agents are saturated monoalcohols such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxymethyloxetane or tetrahydrofurfuryl alcohol, diethylene glycol monoalkyl ethers, for example diethylene glycol monobutyl ether, unsaturated alcohols such as allyl alcohol, 1,1-dimethylallyl alcohol or olein alcohol, aromatic alcohols such as phenol, the isomeric cresols or methoxyphenols, araliphatic alcohols such as benzyl alcohol, anisyl alcohol or cinnamyl alcohol, secondary monoamines such as dimethylamine, diethylamine, dipropylamine, diisopropylamine, dibutylamine, bis(2-ethylhexyl)amine, N-methyl- and N-ethylcyclohexylamine or dicyclohexylamine, and heterocyclic secondary amines such as morpholine, pyrrolidine, piperidine or 1H-pyrazole. Preferred starter molecules are saturated monoalcohols of the abovementioned type. It is particularly preferable to use diethylene glycol monobutyl ethers or n-butanol as starter molecules.

Alkylene oxides suitable for the alkoxylation reaction are especially ethylene oxide and propylene oxide and these may be employed in the alkoxylation reaction in any desired sequence or else in admixture.

Employable as component B1) are organic di- or polyamines such as for example 1,2-ethylenediamine, 1,2- and 1,3-diaminopropane, 1,4-diaminobutane, 1,6-diaminohexane, isophoronediamine, an isomer mixture of 2,2,4- and 2,4,4-trimethylhexamethylenediamine, 2-methylpentamethylenediamine, diethylenetriamine, 4,4-diaminedicyclohexylmethane hydrazine hydrate and/or dimethylethylenediamine.

Also employable as component B1) are compounds which comprise not only a primary amino group but also secondary amino groups or not only an amino group (primary or secondary) but also OH groups. Examples thereof are primary secondary amines, such as diethanolamine, 3-amino-1-methylaminopropane, 3-amino-1-methylaminopropane, 3-amino-1-cyclohexylaminopropane, 3-amino-1-methylaminobutane, alkanolamines such as N-aminoethylethanolamine, ethanolamine, 3-aminopropanol, neopentanolamine.

Also employable as component B1) are monofunctional isocyanate-reactive amine compounds, such as for example methylamine, ethylamine, propylamine, butylamine, octylamine, laurylamine, stearylamine, isononyloxypropylamine, dimethylamine, diethylamine, dipropylamine, dibutylamine, N-methylaminopropylamine, diethyl(methyl)aminopropylamine, morpholine, piperidine, or suitable substituted derivatives thereof, amide amines formed from diprimary amines and monocarboxylic acids, monoketime of diprimary amines, primary/tertiary amines, such as N,N-dimethylaminopropylamine.

It is preferable to employ 1,2-ethylenediamine, bis(4-aminocyclohexyl)methane, 1,4-diaminobutane, isophorondiamine, ethanolamine, diethanolamine and diethylenetriamine.

Suitable anionically hydrophilizing compounds of component B2) are alkali metal salts of the mono- and diaminosulfonic acids. Examples of such anionic hydrophilizing agents are salts of 2-(2-aminoethylamino)ethanesulfonic acid, ethylenediaminepropylsulfonic or ethylenediaminebutylsulfonic acid, 1,2- or 1,3-propylendiamine-β-ethylsulfonic acid or taurine. The salt of cyclohexaminopropanesulfonic acid (CAPS) from WO-A 01/88006 can also be used as an anionic hydrophilizing agent.

Particularly preferred anionic hydrophilizing agents B2) are those containing sulfonate groups as ionic groups and two amino groups, such as the salts of 2-(2-aminoethylamino)ethylsulfonic acid and 1,3-propylenediamine-β-ethylsulfonic acid. It is also possible to use mixtures of anionic and nonionic hydrophilization agents for hydrophilization.

In a preferred embodiment for producing the aqueous polyurethane dispersions the components A1) to A4) and B1) to B2) are employed in the following amounts, wherein the individual amounts always sum to 100% by weight:
  5% to 40% by weight of component A1),
  55% to 90% by weight of A2),
  0.5% to 20% by weight of the sum of the components A3) and B1)
  0.1% to 25% by weight of the sum of the components A4) and B2), wherein based on the total amounts of the components A1) to A4) and B1) to B2) 0.1% to 5% by weight of anionic/potentially anionic hydrophilization agents from A4) and/or B2) are used.

In a particularly preferred embodiment for producing the aqueous polyurethane dispersions the components A1) to A4) and B1) to B2) are used in the following amounts, wherein the individual amounts always sum to 100% by weight:
  5% to 35% by weight of component A1),
  60% to 90% by weight of A2),
  0.5% to 15% by weight of the sum of the components A3) and B1)
  0.1% to 15% by weight of the sum of the components A4) and B2), wherein based on the total amounts of the components A1) to A4) and B1) to B2) 0.2% to 4% by weight of anionic/potentially anionic hydrophilization agents from A1) and/or B2) are used.

In a very particularly preferred embodiment for producing the aqueous polyurethane dispersions the components A1) to A4) and B1) to B2) are employed in the following amounts, wherein the individual amounts always sum to 100% by weight:
  10% to 30% by weight of component A1),
  65% to 85% by weight of A2),
  0.5% to 14% by weight of the sum of the components A3 and B1)
  0.1% to 13.5% by weight of the sum of the components A4) and B2), wherein based on the total amounts of the components A1) to A4) and B1) to B2) 0.5% to 3.0% by weight of anionic/potentially anionic hydrophilization agents from A4) and/or B2) are used.

The production of the polyurethane dispersions may be carried out in one or more stages in homogeneous phase or, in the case of a multistage reaction, partially in disperse phase. After completely or partially performed polyaddition from A1) to A4), a dispersing, emulsifying or dissolving step is carried out. This is optionally followed by a further polyaddition or modification in disperse phase.

Any prior art process can be used, for example the prepolymer mixing process, the acetone process or the melt dispersing process. The acetone process is preferred.

For production by the acetone process the constituents A2) to A4) and the polyisocyanate component A1) are usually, in order to produce an isocyanate-functional polyurethane prepolymer, wholly or partially introduced as an initial charge and optionally diluted with a water-miscible but isocyanate-inert solvent and heated to temperatures in the range from 50° C. to 120° C. The isocyanate addition reaction can be accelerated using the catalysts known in polyurethane chemistry. Suitable solvents are the customary aliphatic, keto-functional solvents such as acetone, 2-butanone, which may be added not just at the start of the production process but also later, optionally in portions. Acetone and 2-butanone are preferred and acetone is particularly preferred. The addition of other solvents without isocyanate-reactive groups is also possible, but not preferred. Subsequently any constituents of A1) to A4) optionally not added at the start of the reaction are added.

In the production of the polyurethane prepolymer from A1) to A4), the amount of substance ratio of isocyanate groups to isocyanate-reactive groups is generally 1.5 to 3.5, preferably 1.1 to 3.0, particularly preferably 1.1 to 2.5. The reaction of components A1) to A4) to afford the prepolymer is effected partially or completely, but preferably completely. Polyurethane prepolymers containing free isocyanate groups are thus obtained in substance or in solution.

Subsequently, if not yet effected or only partially effected, the prepolymer obtained is dissolved using aliphatic ketones such as acetone or 2-butanone in a further process step. The reaction of components A1) to A4) to afford the prepolymer is effected partially or completely, but preferably completely. Polyurethane prepolymers containing free isocyanate groups are thus obtained in substance or in solution.

The neutralization step for partial or complete conversion of potentially anionic groups into anionic groups employs bases such as tertiary amines, for example trialkylamines having 1 to 12, preferably 1 to 6, carbon atoms in each alkyl radical or alkali metal bases such as the relevant hydroxides.

Examples thereof are trimethylamine, triethylamine, methyldiethylamine, tripropylamine, N-methylmorpholine, methyldiisopropylamine, ethyldiisopropylamine and diisopropylethylamine. The alkyl radicals may for example also bear hydroxyl groups, such as in the case of the dialkylmonoalkanolamines, alkyldialkanolamines and trialkanolamines. Employable neutralizing agents also include inorganic bases such as aqueous sodium, lithium or potassium hydroxide.

Sodium hydroxide, lithium hydroxide or potassium hydroxide are preferred and sodium hydroxide, lithium hydroxide or potassium hydroxide are particularly preferred. It is very particularly preferable when the sodium, lithium or potassium ions are already bonded as a cation to anionically functionalized building blocks.

The amount of substance of the bases is generally 50 and 125 mol %, preferably between 70 and 100 mol %, of the molar amount of the acid groups to be neutralized. The neutralization can also be effected simultaneously with the dispersing when the dispersion water already contains the neutralizing agent.

In the chain extension of stage B), $NH_2$— and/or NH-functional components are reacted with the still remaining isocyanate groups of the prepolymer. It is preferable when the chain extension/termination is carried out prior to the dispersing in water.

Suitable components for chain extension are organic di- or polyamines B1) such as for example ethylenediamine, 1,2- and 1,3-diaminopropane, 1,4-diaminobutane, 1,6-diaminohexane, isophoronediamine, isomeric mixture of 2,2,4- and 2,4,4-trimethylhexamethylenediamine, 2-methylpentamethylenediamine, diethylenetriamine, diaminodicyclohexylmethane and/or dimethylethylendiamine.

Also employable are compounds B1) which comprise not only a primary amino group but also secondary amino groups or not only an amino group (primary or secondary) but also OH groups. Examples thereof which are used are primary/secondary amines, such as diethanolamine, 3-amino-1-methylaminopropane, 3-amino-1-ethylaminopropane, 3-amino-1-cyclohexylaminopropane, 3-amino-1-methylaminobutane, alkanolamines such as N-aminoethylethanolamine, ethanolamine, 3-aminopropanol, neopentanolamine for chain extension or termination.

For chain termination it is customary to use amines B1) having an isocyanate-reactive group, for example methylamine, ethylamine, propylamine, butylamine, octylamine, laurylamine, stearylamine, isononyloxypropylamine, dimethylamine, diethylamine, dipropylamine, dibutylamine, N-methylaminopropylamine, diethyl(methyl)aminopropylamine, morpholine, piperidine, or suitable substituted derivatives thereof, amide amines formed from diprimary amines and monocarboxylic acids, monoketime of diprimary amines, primary/tertiary amines, such as N,N-dimethylaminopropylamine. When anionic hydrophilizing agents according to definition B2) having $NH_2$ groups or NH groups are used for chain extension, the chain extension of the prepolymers is preferably effected prior to the dispersing.

The degree of chain extension, i.e. the equivalent ratio of NCO-reactive groups of the compounds used for chain extension and chain termination to free NCO groups of the prepolymer, is generally between 40% and 150%, preferably between 50% and 120%, particularly preferably between 60% and 120%.

The aminic components B1) and B2) may optionally be used in diluted form in the process according to the invention, individually or in mixtures, wherein any desired sequence of addition is possible in principle. When water is used as a diluent, the diluent content of the component for chain extension used in B) is preferably in the range from 40% to 95% by weight.

Dispersing is preferably carried out following chain extension. To this end, the dissolved and chain-extended polyurethane polymer is either introduced into the dispersion water, optionally under high shear, for example vigorous stirring, or, conversely, the dispersion water is stirred into the chain-extended polyurethane polymer solutions. It is preferable when the water is added to the dissolved, chain-extended polyurethane polymer.

The solvent still present in the dispersions after the dispersion step is typically subsequently removed by distillation, Removal even during dispersing is likewise possible. The residual content of organic solvents in the polyurethane dispersions is typically less than 2% by weight, preferably less than 1% by weight, based on the total dispersion.

The pH of the polyurethane dispersions is typically less than 8.0, preferably less than 7.5, and is particularly preferably between 5.5 and 7.5. The polyurethane dispersions typically contain at least 10% by weight of polyurethane based on the solids content of all film-forming polymers present in the dispersion. However, it is preferable when at least 50% by weight, more preferably at least 90% by weight, particularly preferably at least 95% by weight and especially preferably 100% by weight of polyurethane are present as film-forming polymer.

If the use of polyurethane as film-forming polymer is not exclusive it is also possible to employ other polymer dispersions, for example based on polyesters, poly(meth)acrylates, polyepoxides, polyvinyl acetates, polyethylene, polystyrene, polybutadienes, polyvinyl chloride and/or corresponding copolymers. The polyurethane dispersions may also contain auxiliary and/or additive substances in addition to the polymer dispersions. Examples of such auxiliary and additive substances are crosslinkers, thickeners, thixotropic agents, stabilizers, antioxidants, light stabilizers, emulsifiers, surfactants, plasticizers, pigments, fillers and flow control agents.

In a further preferred embodiment the number-average particle size of the particles in the aqueous polyurethane dispersion determined by laser correlation spectroscopy is less than 1000 nm, preferably less than 500 nm. Such particle sizes can bring about a good sedimentation stability of the dispersions.

In a further preferred embodiment the aqueous polyurethane dispersion has solids contents of 10% to 70% by weight, particularly preferably of 30% to 70% by weight, very particularly preferably of 30% to 65% by weight, based on the polyurethane present therein.

In a further preferred embodiment the aqueous dispersion of an OH-containing polymer which further contains an NCO-containing compound comprises the components:

A) one or more compounds comprising uncrosslinked polymer-bonded (meth)acrylates having an OH number of 20 to 300 mg KOH/g of substance and/or B) optionally compounds distinct from A) having at least one isocyanate-reactive group and at least one radiation-curable double bond, C) optionally one or more compounds having at least one isocyanate-reactive group but no radiation-curable double bonds, D) one or more compounds having at least one isocyanate-reactive group and additionally groups which are nonionic, anionic or capable of forming anionic groups and have a dispersing effect for the polyurethane acrylates or D') one or more compounds having at least one isocyanate-reactive group and additionally groups which are cationic or capable of forming cationic groups and have a dispersing effect for the polyurethane acrylates, E) one or more organic compounds having 2 or more isocyanate groups, F) optionally neutralizing amines in combination with compounds D) or F') neutralization acids F') in combination with compounds D'), G) optionally urethanization catalysts and optionally further assistant and additive substances.

Suitable as component A) are the known-per-se hydroxyl-containing polyepoxy (meth)acrylates having an OH number in the range from 20 to 300 mg KOH/g, preferably from 100 to 280 mg KOH/g, particularly preferably from 150 to 250 mg KOH/g. it is preferable to employ aromatic hydroxyl-containing polyepoxy (meth)acrylates based on reaction products of acrylic acid and/or methacrylic acid with aromatic glycidyl ethers (epoxides), particularly preferably aromatic glycidyl ethers of monomeric, oligomeric or polymeric bisphenol A and/or bisphenol F or alkoxylated derivatives thereof. The compounds enumerated under component A) may be used alone or else in mixtures.

Component B) includes compounds distinct from component A) having at least one isocyanate-reactive group and at least one radiation-curable double bond.

Component B) preferably contains monohydroxyl-functional (meth)acrylate-containing alcohols. Such monohydroxyl-functional, (meth)acrylate-containing alcohols are for example 2-hydroxyethyl (meth)acrylate, caprolactone-extended modifications of 2-hydroxyethyl (meth)acrylate, 2-hydroxypropyl (meth)acrylate, 4-hydroxybutyl (meth)acrylate, 3-hydroxy-2,2-dimethylpropyl (meth)acrylate, the on average monohydroxyl-functional di-, tri- or penta(meth)acrylates of polyhydric alcohols such as trimethylolpropane, glycerol, pentaerythritol, ditrimethylolpropane, dipentaerythritol, ethoxylated, propoxylated or alkoxylated trimethylolpropane, glycerol, pentaerythritol, ditrimethylolpropane, dipentaerythritol or technical mixtures thereof.

Particularly preferred as monohydroxyl-functional, (meth)acrylate-containing alcohols are 2-hydroxyethyl (meth)acrylate, 2-hydroxypropyl (meth)acrylate, pentaerythritol triacrylate, dipentaerythritol pentaacrylate and the addition product of glycidyl ethylmethylheptanoate with (meth)acrylic acid and technical mixtures thereof. 2-hydroxyethyl (meth)acrylate is very particularly preferred.

Also employable in component B) as monohydroxyl-functional, (meth)acrylate-containing alcohols are alcohols obtainable from the reaction of double bond-containing acids with optionally double bond-containing monomeric epoxy compounds.

The component B) may further contain oligomers and polymers containing hydroxyl groups and unsaturated groups. Polyester (meth)acrylates are preferred.

Among the polyester (meth)acrylates preference is given to using as component B) the hydroxyl-containing polyester (meth)acrylates having an OH number in the range from 15 to 300 mg of KOH/g of substance, especially preferably from 60 to 200 mg of KOH/g of substance.

These polyester (meth)acrylates are preferably obtained by reaction of b1) polyfunctional alcohols of 62 to 320 g/mol with b2) dicarboxylic acids and b3) acrylic acid, methacrylic acid and/or dimeric acrylic acid.

Particularly preferred for b1) are di-, tri- and tetrafunctional alcohols such as butanediol, pentanediol, 1,6-hexanediol, neopentyl glycol, cyclohexanediol, 1,4-cyclohexanedimethanol, diethylene glycol, triethylene glycol, tetraethylene glycol, dipropylene glycol, tripropylene glycol, glycerol, trimethylolpropane and pentaerythritol. Also the reaction product of 1 mol of trimethylolpropane with 4 mol of ethylene oxide.

Particularly preferred for b2) are dicarboxylic acids having a molecular weight in the range from 104 to 600 g/mol and/or anhydrides thereof, for example phthalic acid, phthalic anhydride, isophthalic acid, tetrahydrophthalic acid, tetrahydrophthalic anhydride, hexahydrophthalic acid, hexahydrophthalic anhydride, cyclohexanedicarboxylic acid, maleic anhydride, fumaric acid, malonic acid, succinic acid, succinic anhydride, glutaric acid, adipic acid, pimelic acid, suberic acid, sebacic acid, dodecanedioic acid. Very particularly preferred dicarboxylic acids are aliphatic dicarboxylic acids having 4-8 carbon atoms, in particular adipic acid.

Particularly preferred for b3) are acrylic acid and methacrylic acid or mixtures thereof, acrylic acid being especially preferred.

The monohydroxyl-functional, (meth)acrylate-containing alcohols and also oligomers and polymers containing hydroxyl groups and unsaturated groups described as employable as component B) may be employed alone or else as mixtures.

Preferably employable as component C) are difunctional amines, di- or trifunctional alcohols and hydroxyl-functional polyester alcohols. Also employed in small amounts (preferably <5% by weight, particularly preferably <3.5% by weight) in addition to the alcohols described under b1) and without the use of b3) polyesters produced by reaction of b1) and b2) for increasing the weight-average of the molecular weight Mw of the polyurethane acrylates are diamines.

One advantage of UV-curable polyurethane dispersions as a free-radically crosslinkable infusion medium in the presence of a UV or thermal free-radical starter (as part of the infusion formulation) in the forced drying/exposure of the infusion/coating is that the dispersion may be free-radically post-cured at a temperature below the softening temperature of the 3D-printed article. Limitations such as may arise from a pot life in 2K formulations are avoided.

Particularly preferably employed as polyfunctional alcohols in component C) are neopentyl glycol, 1,4-butanediol, 1,4-cyclohexanedimethanol, 1,6-hexanediol, 2-ethyl-1,3-hexanediol and/or trimethylolpropane. Preferably employed as hydroxyl-functional polyester alcohols in component C) are reaction products of phthalic acid, phthalic anhydride, isophthalic acid and/or aliphatic dicarboxylic acids having 4-8 carbon atoms, in particular adipic acid, and 1,6-hexanediol, 2-ethyl-1,3-hexanediol, butanediol, ethylene glycol, di- or triethylene glycol and/or neopentyl glycol. In the production of hydroxyfunctional polyesters, it may be particularly advantageous to employ castor oil as a hydroxyl-functional building block.

It is particularly preferable to employ as amines in component C) aliphatic diamines, especially preferably ethylenediamine, 1,6-hexamethylenediamine and/or isophoronediamine.

The compounds enumerated under component C) may be used alone or else in mixtures.

Employed as component D) are one or more compounds having at least one isocyanate-reactive group and additionally groups which are nonionic, anionic or capable of forming anionic groups and have a dispersing effect for the polyurethane acrylates.

The hydrophilizing groups include anionic groups d1) and/or groups which derive from potentially anionic groups d2) (for example through salt formation), for example sulfonium, phosphonium, carboxylate, sultanate and/or phosphonate groups. Preferentially suitable isocyanate-reactive groups are hydroxyl and amino groups.

Compounds containing potentially anionic groups d2) comprise compounds such as for example mono- and dihydroxycarboxylic acids, mono- and diaminocarboxylic acids, mono- and dihydroxysulfonic acids, mono- and diaminosulfonic acids, mono- and dihydroxyphosphonic acids, and mono- and diaminophosphonic acids.

Preferred compounds containing potentially anionic groups d2) are selected from the group consisting of dimethylolpropionic acid, dimethylolbutyric acid, hydroxypivalic acid, N-(2-aminoethyl(alanine, 2-(2-aminoethylamino) ethanesulfonic acid, ethylenediaminepropyl or -butylsulfonic acid, 1,2- or 1,3-propylenediaminethylsulfonic acid, 3-(cyclohexylamino)-propane-1-sulfonic acid, malic acid, citric acid, glycolic acid, lactic acid, glycine, alanine, taurine, lysine, 3,5-diaminobenzoic acid and an addition product of isophoronediamine (1-amino-3,3,5-trimethyl-5-aminomethylcyclohexane, IPDA) and acrylic acid (EP-A 916 647, Example 1).

It is particularly preferable when the component D) contains as compounds having potentially anionic groups hydroxypivalic acid and/or dimethylolpropionic acid, especially preferably dimethylolpropionic acid.

Likewise included in component D) are nonionic compounds having a dispersing effect for polyurethane acrylates.

Nonionic hydrophilic compounds d3) are for example monovalent polyalkylene oxide polyether alcohols having a statistical average of 5 to 70, preferably 7 to 55, ethylene oxide units per molecule, such as are obtainable in a manner known per se by alkoxylation of suitable starter molecules (for example in Ullmanns Encyclopädie der technischen Chemie, 4th edition, volume 19, Verlag Chemie, Weinheim p. 31-38). Suitable starter molecules are for example saturated monoalcohols such as methanol, ethanol, n-propanol, isopropanol, n-butanol, isobutanol, sec-butanol, the isomeric pentanols, hexanols, octanols and nonanals, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxymethyloxetane or tetrahydrofurfuryl alcohol. Likewise suitable are diethylene glycol monoalkyl ethers such as for example diethylene glycol monobutyl ether; unsaturated alcohols such as allyl alcohol, 1,1-dimethylallyl alcohol or oleyl alcohol, aromatic alcohols such as phenol, the isomeric cresols or methoxyphenols, araliphatic alcohols such as benzyl alcohol, anisyl alcohol or cinnamyl alcohol; secondary monoamines such as dimethylamine, diethylamine, dipropylamine, diisopropylamine, dibutylamine, bis(2-ethylhexyl)amine, N-methyl- and N-ethylcyclohexylamine or dicyclohexylamine, and heterocyclic secondary amines such as morpholine, pyrrolidine, piperidine or 1H-pyrazole.

Preferred starter molecules are saturated monoalcohols and diethylene glycol monoalkyl ethers. It is particularly preferable to employ diethylene glycol monobutyl ether as a starter molecule.

Alkylene oxides suitable for the alkoxylation reaction are in particular ethylene oxide and propylene oxide and these may be used in the alkoxylation reaction in any sequence or else in admixture.

The polyalkylene oxide polyether alcohols are either pure polyethylene oxide polyethers or mixed polyalkylene oxide polyethers whose alkylene oxide units consist to an extent of at least 30 mol %, preferably to an extent of at least 40 mol %, of ethylene oxide units. Preferred nonionic hydrophilic compounds A4) are monofunctional mixed polyalkylene oxide polyethers comprising at least 40 mol % of ethylene oxide units and not more than 60 mol % of propylene oxide units.

The compounds enumerated under component D) may also be used in mixtures.

Preferably employable in component D') are compounds having potentially cationic groups such as for example triethanolamine, N-methyldiethanolamine and N,N-dimethylethanolamine. It will be appreciated that it is also possible to use compounds having a cationic nature, such as for example compounds having ammonium groups, comprising further isocyanate-reactive components. It is particularly preferable to use N-methyldiethanolamine.

Ionic hydrophilization and the combination of ionic and nonionic hydrophilization are preferred over purely nonionic hydrophilization.

The component E) contains polyisocyanates selected from the group of aromatic, araliphatic, aliphatic or cycloaliphatic polyisocyanates or mixtures of such polyisocyanates having at least 2 isocyanate groups per molecule. Suitable polyisocyanates are for example 1,3-cyclohexane diisocyanate, 1-methyl-2,4-diisocyanatocyclohexane, 1-methyl-2,6-diisocyanatocyclohexane, tetramethylene diisocyanate, 4,4'-diisocyanatodiphenylmethane, 2,4'-diisocyanatodiphenylmethane, 2,4-diisocyanatotoluene, 2,6-diisocyanatotoluene, $\alpha,\alpha,\alpha',\alpha'$-tetramethyl-m- or -p-xylylene diisocyanate, 1,6-hexamethylene diisocyanate, 1-isocyanato-3,3,5-trimethyl-5-isocyanatomethylcyclohexane (isophorone diisocyanate or IPDI), 4,4'-diisocyanatodicyclohexylmethane, 1,3-bis(isocyanatomethyl)benzene (XDI), 1,3-bis(1-isocyanato-1-methylethyl)benzene (TMXDI), 4-isocyanatomethyloctane 1,8-diisocyanate (triisocyanatononane, TIN) (EP-A 928 799), homologs or oligomers of these enumerated polyisocyanates having biuret, carbodiimide, isocyanurate, allophanate, iminooxadiazinedione and/or uretdione groups, and mixtures thereof.

Aliphatic and cycloaliphatic isocyanates are preferred. Particular preference is given to 1,6-hexamethylene diisocyanate, 1-isocyanato-3,3,5-trimethyl-5-isocyanatomethyl-cyclohexane (isophorone diisocyanate or IPDI) and 4,4'-diisocyanatodicyclohexylmethane and also homologs or oligomers of hexamethylene diisocyanate, 1-isocyanato-3,3,5-trimethyl-5-isocyanatomethyl-cyclohexane (isophorone diisocyanate or IPDI) and 4,4'-diisocyanatodicyclohexylmethane having biuret, carbodiimide, isocyanurate, allophanate, iminooxadiazinedione and/or uretdione groups, and mixtures thereof.

The compounds enumerated under component E) may be used alone or else in mixtures.

The acids recited under component D) are optionally converted to the corresponding salts by reaction with neutralization amines (component F), typically but not exclusively tertiary amines, preferably triethylamine, ethyldiisopropylamine, dimethylcyclohexylamine, dimethylethanolamine, methyldiethanolamine, triethanolamine, diethanolamine, N-butyldiethanolamine, ammonia and/or N-ethylmorpholine. The degree of neutralization is preferably between 50% and 125%.

The bases recited under component D') are converted to the corresponding salts by reaction with neutralization agents F') such as for example inorganic acids, for example hydrochloric acid, phosphoric acid and/or sulfuric acid, and/or preferably organic acids, for example formic acid, acetic acid, lactic acid, methane-, ethane- and/or p-toluenesulfonic acid. The use of acetic acid, lactic acid and phosphoric acid is particularly preferred. Lactic acid is especially preferred. The degree of neutralization is preferably between 50% and 125%.

Optionally employable as compounds of the component G) are one or more catalysts. These are catalysts for accelerating urethane formation. Known catalysts for this purpose are for example tin octoate, tin dioctoate, zinc dioctoate, dibutyltin dilaurate, dimethylbis[(1-oxoneodecyl)oxy]stannane, dimethyltin dicarboxylate, zirconium bis(ethylhexanoate), zirconium acetylacetonate, or tertiary amines, for example 1,4-diazabicyclo[2.2.2]octane, diazabicyclononane, diazabicylcloundecane, 1,1,3,3-tetramethylguanidine, 1,3,4,6,7,8-hexahydro-1-methyl-2H-pyrimido(1,2-a) pyrimidine.

Dibutyltin dilaurate, tin dioctoate, dimethylbis[(1-oxoneodecyl)oxy]stannane and dimethyltin dicarboxylate are preferred.

In one particular embodiment exclusively tin-free suitable catalysts, for example based on bismuth or zirconium, are employed.

It will be appreciated that further additive substances may optionally be employed. These may be for example additives customary in the field of lacquer technology such as solvents, plasticizers, flow control agents, defoamers, stabilizers or adhesion promoters. Employable flow control agents include surface-active compounds such as for example polydimethylsiloxanes. The concurrent use of multiple additive substances of one type may also be advantageous. It will be appreciated that it may likewise be advantageous to use multiple additives of multiple types.

Component A) and optionally components B) and (ii) are used in amounts such that the content of radiation-curable double bonds is between 0.5 and 6.0, preferably between 1.0 and 5.0, particularly preferably between 1.4 and 3.0, mol/kg of non-aqueous constituents of the dispersion.

The abovementioned polyurethane dispersion optionally contains a further component that is a reactive diluent which comprises at least one free-radically polymerizable group and which may be at most partially bonded to the polyurethane acrylate via optional incorporable OH groups or is otherwise preferably present as an unbonded monomer.

In a preferred embodiment the only radiation-curable constituent present is component A) (polyepoxyacrylates). Especially in this case the component A) is preferably selected from aromatic or aliphatic polyepoxy(meth)acrylates, polyester(meth)acrylates, polyepoxy(meth)acrylates, monohydroxyl- or dihydroxyl-functional (meth)acrylate-containing compounds or mixtures thereof; preferably from polyepoxy(meth)acrylates, especially preferably from aromatic polyepoxy(meth)acrylates.

In the context of this document "(meth)acrylate" refers to corresponding acrylate or methacrylate functions or to a mixture of both.

In a preferred embodiment the proportion of non-polymer-bonded radiation-curable compounds is <30% by weight based on the solids content of the produced polyurethane acrylate, particularly preferably <20% by weight, very particularly preferably <10% by weight, wherein the non-polymer-bonded radiation-curable compounds are in particular in the form of acrylates having two or more C—C double bonds.

It is further preferred when the proportion of isocyanate-containing compounds is >10% by weight based on the solids content of the produced polyurethane acrylate, particularly preferably >20% by weight.

It is likewise preferable when the following combination of features is chosen for the production of the dispersion:
polymer-bonded radiation curable groups, particularly preferably polyurethane(meth)acrylates, polyester (meth)acrylates, polyepoxy(meth)acrylates, polyether (meth)acrylates, especially preferably polyepoxy (meth)acrylates, and/or
polymer-bonded radiation-curable groups, by reaction of one or more compounds of monohydroxyl- or dihydroxyl-functional (meth)acrylate-containing alcohols with compounds having at least one isocyanate-reactive group, particular preference being given to aliphatic compounds, and
a high proportion of compounds of component E), preferably >10%, particularly preferably >20% as the sum of all NCO-containing inputs.

In a further preferred embodiment the NCO-containing compound in the aqueous preparation of the NCO-containing compound without OH-containing polymers in the preparation is a compound based on aliphatic, cycloaliphatic, araliphatic and/or aromatic diisocyanates having:
a) an average isocyanate functionality of at least 2.0
b) a content of isocyanate groups (calculated as NCO; molecular weight=42) of 5.0% to 25.0% by weight and
(c) an anionically and/or nonionically hydrophilizing component, preferably a component having a content of ethylene oxide units bonded within polyether chains (calculated as $C_2H_4O$; molecular weight=44) of 2% to 50% by weight, wherein the polyether chains contain a statistical average of 5 to 35 ethylene oxide units.

Preferably the polyether chains are still bonded to an extent of at least 60 mol % via allophanate groups to in each case two polyisocyanate molecules which are each constructed from at least two diisocyanates.

Details of such water-dispersible polyisocyanates and their production may be found in the European patent EP 0 959 087 B1 which is hereby fully incorporated by reference. The production of the water-dispersible polyisocyanates may be effected when:
(A) a polyisocyanate component having an (average) NCO functionality of 2.0 to 5.0, having a content of aliphatically; cycloaliphatically, araliphatically and/or aromatically bonded isocyanate groups (calculated as NCO; molecular weight=42) of 8.0% to 27.0% by weight and a content of monomeric diisocyanates of less than 1% by weight and
(B) a monovalent polyalkylene oxide polyether alcohol having a statistical average of 5 to 35 ethylene oxide units are reacted with one another while observing an NCO/OHNCO/OH equivalent ratio of 6:1 to 400:1
such that at least 60% of the urethane groups formed by NCO/OH reaction as primary products are further reacted to afford allophanate groups, wherein the quantity ratios of the recited starting compounds are chosen such that the resulting reaction products meet the requirements recited above under a) to c).

This component A) for use in the production of the water dispersible polyisocyanates has an (average) NCO functionality of 2.0 to 5.0, preferably of 2.3 to 4.5, a content of isocyanate groups of 8.0% to 27.0% by weight, preferably 14.0% to 24.0% by weight, and a content of monomeric diisocyanates of less than 1% by weight, preferably less than 0.5% by weight. It comprises at least one organic polyisocyanate having aliphatically, cycloaliphatically, araliphatically and/or aromatically bonded isocyanate groups.

The polyisocyanates or polyisocyanate mixtures of the component A) are any desired polyisocyanates produced by modification of simple aliphatic, cycloaliphatic, araliphatic and/or aromatic diisocyanates and constructed from at least two diisocyanates having a uretdione, isocyanurate, allophanate, biuret, iminooxadiazinedione and/or oxadiazinetrione structure.

Suitable diisocyanates for producing such polyisocyanates are any desired diisocyanates obtainable by phosgenation or by phosgene-free processes, for example by thermal urethane cleavage, having a molecular weight range of 140 to 400 and containing aliphatically, cycloaliphatically, araliphatically and/or aromatically bonded isocyanate groups, such as for example 1,4-diisocyanatobutane, 1,6-diisocyanatohexane (HDI), 2-methyl-1,5-diisocyanatopentane, 1,5-diisocyanato-2,2-dimethylpentane, 2,2,4- and 2,4,4-trimethyl-1,6-diisocyanatohexane, 1,10-diisocyanatodecane, 1,3- and 1,4-diisocyanatocyclohexane, 1,3- and 1,4-bis(isocyanatomethyl)cyclohexane, 1-isocyanato-3,3,5-trimethyl-5-isocyanatomethylcyclohexane (isophoronediisocyanate, IPDI), 4,4'-diisocyanatodicyclohexylmethane, 1-isocyanato-1-methyl-4(3)isocyanatomethylcyclohexane, bis(isocyanatomethyl)norbornane, 1,3- and 1,4-bis(2-isocyanatoprop-2-yl)benzene (TMXDI), 2,4- and 2,6-diisocyanatotoluene (TDI), 2,4'- and 4,4'-diisocyanatodiphenylmethane (MDI), 1,5-diisocyanatonaphthalene or any desired mixtures of such diisocyanates.

It is preferable when the starting components A) are polyisocyanates or polyisocyanate mixtures of the recited type having exclusively aliphatic and/or cycloaliphatically bonded isocyanate groups. Very particularly preferred starting components A) are polyisocyanates or polyisocyanate mixtures having ran isocyanurate structure based on HDI, IPDI and/or 4,4'-diisocyanatodicyclohexylmethane.

This component B) is selected from monovalent polyalkylene oxide polyether alcohols having a statistical average of 5 to 35, preferably 7 to 30, ethylene oxide units per molecule, such as are obtainable in a manner known per se by alkoxylation of suitable starter molecules, or any desired mixtures of such polyether alcohols.

Suitable starter molecules for producing these polyether alcohols B) employed include for example: saturated monoalcohols such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxymethyloxetane or tetrahydrofurfuryl alcohol; unsaturated alcohols such as allyl alcohol, 1,1-dimethylallyl alcohol or oleyl alcohol, aromatic alcohols such as phenol, the isomeric cresols or methoxyphenols, araliphatic alcohols such as benzyl alcohol, anisyl alcohol or cinnamyl alcohol; secondary monoamines such as dimethylamine, diethylamine, dipropylamine, diisopropylamine, dibutylamine, diisobutylamine, bis(2-ethylhexyl) amine, N-methyl- and N-ethylcyclohexylamine or dicyclohexylamine and heterocyclic secondary amines such as morpholine, pyrrolidine, piperidine or 1H-pyrazole.

Preferred starter molecules are saturated monoalcohols having up to 4 carbon atoms. It is particularly preferable to employ methanol as a starter molecule.

Alkylene oxides suitable for the alkoxylation reaction are especially ethylene oxide and propylene oxide, which can be used in the alkoxylation reaction in any sequence or else in a mixture.

These polyalkylene oxide polyether alcohols B) are either pure polyethylene oxide polyethers or mixed polyalkylene oxide polyethers whose alkylene oxide units consist to an extent of at least 30 mol %, preferably to an extent of at least 40 mol %, of ethylene oxide units.

Preferred starting components B) of this type are pure polyethylene glycol monomethyl ether alcohols having a statistical average of 7 to 30, very particularly preferably 7 to 25, ethylene oxide units.

Optionally also co-usable as hydrophilic construction components in subordinate amounts in addition to these recited polyether alcohols B) are further isocyanate-reactive compounds having anionic or cationic groups, for example having carboxylate, sulfonate or ammonium groups.

To perform the synthesis the starting components A) and B) are reacted with one another at temperatures of 40° C. to 180° C., preferably 50° C. to 150° C., while observing an NCO/OH equivalent ratio of 6:1 to 400:1, preferably of 8:1 to 140:1, such that at least 60 mol %, preferably at least 80 mol %, particularly preferably at least 90 mol % of the urethane groups formed by NCO/OH reaction as primary products are further reacted to afford allophanate groups.

Suitable catalysts may optionally be co-used to accelerate the allophanatization reaction. These are the customary known allophanatization catalysts for example metal carboxylates, metal chelates or tertiary amines.

Suitable allophanatization catalysts are in particular zinc compounds, such as for example zinc(II) stearate, zinc(II) n-octanoate, zinc(II) 2-ethyl-1-hexanoate, zinc(II) naphthenate or zinc(II) acetylacetonate, tin compounds, such as, for example, tin(II) n-octanoate, tin(II) 2-ethyl-1-hexanoate, tin(II) laurate, dibutyltin oxide, dibutyltin dichloride, dibutyltin diacetate, dibutyltin dilaurate, dibutyltin dimaleate or dioctyltin diacetate, aluminum tri(ethylacetoacetate), iron(III) chloride, potassium octoate, manganese compounds, cobalt compounds or nickel compounds, and also strong acids, such as for example trifluoroacetic acid, sulfuric acid, hydrogen chloride, hydrogen bromide, phosphoric acid or perchloric acid or any desired mixtures of these catalysts.

The progress of the reaction may in this synthesis be monitored by titrimetric determination of the NCO content for example. The reaction is terminated once the desired NCO content has been achieved, preferably when the molar ratio of allophanate groups to urethane groups in the reaction mixture is at least 4:1, particularly preferably at least 9:1. In the case of purely thermal reaction management this may be effected by cooling the reaction mixture to room temperature for example. However, in the case of the preferred co-use of an allophanatization catalyst of the recited type the reaction is generally terminated by addition of suitable catalyst poisons, for example acid chlorides such as benzoyl chloride or isophthaloyl dichloride.

Furthermore, in this synthesis the quantity ratios of the starting components are in the context of the recited specifications chosen such that the resulting polyisocyanate mixtures meet the specifications recited above under a) to c), wherein a) the average NCO functionality is preferably 2.3 to 9.9, particularly preferably 2.8 to 5.8, b) the NCO content is preferably 6.0% to 22.5% by weight, particularly preferably 8.5% to 21.5% by weight and c) the content of ethylene oxide units bonded within polyether chains is preferably 5% to 40% by weight, particularly preferably 7% to 25% by weight.

The recited specifications concerning the NCO functionality of the process products obtained from the synthesis relate to the value which may be calculated from the nature and functionality of the starting components according to the formula $$F = \frac{\Sigma val NCO - \Sigma(1+x) \cdot \text{mol OH}}{\Sigma\left(\frac{val\ NCO}{f_{NCO}}\right) + \Sigma \text{mol OH} - \Sigma(1+x) \cdot \text{mol OH}}$$

in which x represents the proportion of the urethane groups converted into allophanate groups in the process according to the invention. The functionality $f_{NCO}$ of the starting polyisocyanate A) may be calculated from the NCO content and the molecular weight determined for example by gel permeation chromatography (GPC) or vapor pressure osmosis.

In a further preferred embodiment sections of the article that are contacted with the preparation have a porosity $\Phi$ of $\geq 0.01$ to $\leq 0.6$. Porosity $\Phi$ is expressed as:

$$\Phi = 1 - (\rho/\rho_0)$$

wherein $\rho$ represents the density of the volume assigned to the sections of the article that are contacted with the preparation and $\rho_0$ represents the true density of the construction material. The porosity $\Phi$ is preferably $\geq 0.1$ to $\leq 0.5$ and more preferably $\geq 0.2$ to $\leq 0.4$. in the case of such porous volumes the aqueous preparation may also penetrate into the interior of the volume to a greater extent and there too result in an improvement in the density and the mechanical properties of the article. In the powder sintering process the porosity of the 3D-printed article may be controlled within certain limits by means of an intentionally lower output of the laser used for sintering.

In a further preferred embodiment the production of the article by means of the additive manufacturing process comprises the steps of:
applying a layer of particles comprising the construction material onto a target surface;
energizing a selected portion of the layer corresponding to a cross section of the article to join the particles in the selected portion;
repeating the steps of applying and energizing for a plurality of layers so that the joined portions of the adjacent layers become joined to form the article.

This embodiment concerns a powder sintering or powder melting process. If the number of repetitions for applying and irradiating is sufficiently low the article to be constructed may also be referred to as a two-dimensional article. Such a two-dimensional article can also be characterized as a coating. Construction thereof may comprise performing for example $\geq 2$ to $\leq 20$ repetitions for application and irradiation.

It is preferable when at least 90% by weight of the particles have a particle diameter of $\leq 0.25$ mm, preferably $\leq 0.2$ mm, particularly preferably $\leq 0.15$ mm. The energy source for joining the particles may be electromagnetic energy, for example UV to IR light. An electron beam is also conceivable. The joining of the particles in the irradiated portion of the particle layer is typically effected through (partial) melting of a (semi-)crystalline material and joining of the material in the course of cooling. However it is also possible that other transformations of the particles such as a glass transition, i.e. the heating of the material to a temperature above the glass transition temperature, bring about a joining of the particles of the particles to one another.

In a further preferred embodiment the energizing of a selected portion of the layer corresponding to a cross section of the article to join the particles in the selected portion comprises the step of:
irradiating a selected portion of the layer corresponding to a cross section of the article with an energy beam to join the particles in the selected portion.

This form of the method can be regarded as a selective sintering process, especially as a selective laser sintering process (SLS). The energy beam for joining the particles may be a beam of electromagnetic energy, for example a "light beam" of UV to IR light. The beam of energy is preferably a laser beam, particularly preferably having a wavelength between 600 nm and 15 µm. The laser may be in the form of a semiconductor laser or of a gas laser. An electron beam is also conceivable.

In a further preferred embodiment the energizing of a selected portion of the layer corresponding to a cross section of the article to join the particles in the selected portion comprises the steps of:
applying a liquid to a selected portion of the layer corresponding to a cross section of the article, wherein the liquid increases the absorption of energy in the regions of the layer contacted by it relative to the regions not contacted by it;
irradiating the layer so that the particles in regions of the layer contacted by the liquid are joined to one another and the particles in regions of the layer not contacted by the liquid are not joined to one another.

This embodiment may comprise for example applying a liquid containing an IR absorber onto the layer using inkjet methods. The irradiation of the layer leads to selective heating of those particles that are in contact with the liquid including the IR absorber. This makes it possible to achieve a joining of the particles. It is optionally also possible to use a second liquid that is complementary to the energy-absorbing liquid in terms of its behavior toward the energy used. In regions where the second liquid is applied the employed energy is not absorbed but rather reflected. The regions beneath the second liquid are thus shaded. This makes it possible to increase the separation sharpness between regions of the layer that are to be melted and regions of the layer that are not to be melted.

In a further preferred embodiment the production of the article by means of the additive manufacturing process comprises the steps of:
applying a filament of an at least partially molten construction material onto a carrier to obtain a layer of the construction material corresponding to a first selected cross section of the article;
applying a filament of the at least partially molten construction material onto a previously applied layer of the construction material to obtain a further layer of the construction material which corresponds to a further selected cross section of the article and which is joined to the previously applied layer;
repeating the step of applying a filament of the at least partially molten construction material onto a previously applied layer of the construction material until the article has been formed.

This embodiment is a melt coating or fused deposition modeling (FDM) method. If the number of repetitions for the applying is sufficiently low the article to be constructed may also be referred to as a two-dimensional article. Stich a two-dimensional article can also be characterized as a coating. The construction thereof may comprise performing $\geq 2$ to $\leq 20$ repetitions for the applying for example.

The individual filaments which are applied may have a diameter of $\geq 30$ µm to $\leq 2000$ µm, preferably $\geq 40$ µm to $\leq 1000$ µm and particularly preferably $\geq 50$ µm to $\leq 500$ µm.

The first step of this embodiment of the process relates to the construction of the first layer on a carrier. The second step in which further plies are applied to previously applied plies of the construction material is subsequently executed until the desired end result in the form of the article is obtained. The at least partially molten construction material bonds to existing plies of the material in order to form a structure in the z direction.

In a further preferred embodiment, the construction material comprises a thermoplastic polyurethane elastomer having a melting range (DSC, differential scanning calorimetry; second heating at a heating rate of 5 K/min) of ≥20° C. to ≤240° C. (preferably ≥40° C. to ≤220° C., more preferably ≥70° C. to ≤200° C.), a Shore hardness according to DIN ISO 7619-1 of ≥40 A to ≤85 D (preferably ≥50 Shore A to ≤80 Shore D, more preferably ≥60 Shore A to ≤75 Shore D).

In this DSC analysis, the material is subjected to the following temperature cycle: 1 minute at minus 60° C., then heating to 240° C. at 20 kelvin/minute, then cooling to minus 60° C. at 5 kelvin/minute, then 1 minute at minus 60° C., then heating to 240° C. at 20 kelvin/minute.

In a further preferred embodiment, the construction material comprises a thermoplastic polyurethane elastomer which has a melting range (DSC, differential scanning calorimetry; second heating at heating rate 5 K/min) of ≥20° C. to ≤240° C. (preferably ≥40° C. to ≤220° C., more preferably ≥70° C. to ≤200° C.), has a Shore hardness according to DIN ISO 7619-1 of ≥40 A to ≤85 D (preferably ≥50 Shore A to ≤80 Shore D, more preferably ≥60 Shore A to ≤75 Shore D), has a melt volume rate (MVR) according to ISO 1133 (10 kg) at a temperature T of 5 to 15 (preferably ≥6 to ≤12, more preferably ≥7 to ≤10) cm$^3$/10 min and exhibits a change in the melt volume rate (10 kg) at an increase of this temperature T by 20° C. of ≤90 (preferably ≤70, more preferably ≤50) cm$^3$/10 min.

In this DSC analysis too, the material is subjected to the following temperature cycle: 1 minute at minus 60° C., then heating to 220° C. at 20 kelvin/minute, then cooling to minus 60° C. at 5 kelvin/minute, then 1 minute at minus 60° C., then heating to 220° C. at 20 kelvin/minute.

This thermoplastic elastomer, preferably a thermoplastic polyurethane elastomer, has uniform melting characteristics. Melting characteristics are determined via the change in MVR (melt volume rate) according to ISO 1133 at a preheating time of 5 minutes and 10 kg as a function of temperature. Melting characteristics are considered to be "uniform" when the MVR at a starting temperature $T_x$ has a starting value of 5 to 15 cm$^3$/10 min and increases by not more than 90 cm$^3$/10 min as a result of an increase in temperature by 20° C. to $T_{x+20}$.

In a further preferred embodiment, the construction material comprises a thermoplastic polyurethane elastomer obtainable from the reaction of the following components:
a) at least one organic diisocyanate
b) at least one compound having isocyanate-reactive groups and having a number-average molecular weight ($M_n$) of ≥500 g/mol to ≤6000 g/mol and a number-average functionality of the sum total of the components b) of ≥1.8 to ≤2.5
c) at least one chain extender having a molecular weight (Mn) of 60-450 g/mol and a number-average functionality of the sum total of the chain extenders c) of 1.8 to 2.5.

For synthesis of this thermoplastic polyurethane elastomer (TPU), specific examples of isocyanate components a) include: aliphatic diisocyanates such as ethylene diisocyanate, 1,4-tetramethylene diisocyanate, 1,5-pentamethylene diisocyanate, 1,6-hexamethylene diisocyanate, 1,12-dodecane diisocyanate, cycloaliphatic diisocyanates such as isophorone diisocyanate, 1,4-cyclohexane diisocyanate, 1-methylcyclohexane 2,4-diisocyanate and 1-methylcyclohexane 2,6-diisocyanate and the corresponding isomer mixtures, 4,4'-dicyclohexylmethane diisocyanate, 2,4'-dicyclohexylmethane diisocyanate and 2,2'-dicyclohexylmethane diisocyanate and the corresponding isomer mixtures, and also aromatic diisocyanates such as 2,4-tolylene diisocyanate, mixtures of 2,4-tolylene diisocyanate and 2,6-tolylene diisocyanate, 4,4'-diphenylmethane diisocyanate, 2,4'-diphenylmethane diisocyanate and 2,2'-diphenylmethane diisocyanate, mixtures of 2,4'-diphenylmethane diisocyanate and 4,4'-diphenylmethane diisocyanate, urethane-modified liquid 4,4'-diphenylmethane diisocyanates or 2,4'-diphenylmethane diisocyanates, 4,4'-diisocyanato-1,2-diphenylethane and 1,5-naphthylene diisocyanate. Preferably employed are 1,6-hexamethylene diisocyanate, 1,4-cyclohexane diisocyanate, isophorone diisocyanate, dicyclohexylmethane diisocyanate, diphenylmethane diisocyanate isomer mixtures having a 4,4'-diphenylmethane diisocyanate content of more than 96% by weight and especially 4,4'-diphenylmethane diisocyanate and 1,5-naphthylene diisocyanate. The diisocyanates mentioned may be employed singly or in the form of mixtures with one another. They may also be used together with up to 15 mol % (based on total diisocyanate) of a polyisocyanate, but the maximum amount of polyisocyanate that may be added is such as to result in a product that is still thermoplastically processible. Examples of polyisocyanates are triphenylmethane 4,4',4"-triisocyanate and polyphenylpolymethylene polyisocyanates.

Examples of longer-chain isocyanate-reactive compounds covered by b) include those having on average at least 1.8 to 3.0 Zerewitinoff-active hydrogen atoms and a number-average molecular weight of 500 to 10 000 g/mol. These include, in addition to compounds having amino groups, thiol groups or carboxyl groups, especially compounds having two to three, preferably two, hydroxyl groups, specifically those having number-average molecular weights Mn of 500 to 6000 g/mol, particularly preferably those having a number-average molecular weight Mn of 600 to 4000 g/mol, for example hydroxyl group-containing polyester polyols, polyether polyols, polycarbonate polyols and polyester polyamides. Suitable polyester diols may be produced by reacting one or more alkylene oxides having 2 to 4 carbon atoms in the alkylene radical with a starter molecule containing two active hydrogen atoms in bonded form. Examples of alkylene oxides include: ethylene oxide, 1,2-propylene oxide, epichlorohydrin and 1,2-butylene oxide and 2,3-butylene oxide. Preference is given to using ethylene oxide, propylene oxide and mixtures of 1,2-propylene oxide and ethylene oxide. The alkylene oxides may be used individually, in alternating succession or as mixtures. Examples of useful starter molecules include water, amino alcohols such as N-alkyldiethanolamines, for example N-methyldiethanolamine, and diols such as ethylene glycol, 1,3-propylene glycol, 1,4-butanediol and 1,6-hexanediol. It is optionally also possible to use mixtures of starter molecules. Suitable polyether diols further include the hydroxyl-containing polymerization products of tetrahydrofuran. It is also possible to use trifunctional polyethers in proportions of 0% to 30% by weight, based on the bifunctional polyether diols, but at most in such an amount as to result in a product that is still thermoplastically processible. The essentially linear polyether diols preferably have number-average molecular weights n of 500 to 6000 g/mol. They may be used either individually or in the form of mixtures with one another.

Suitable polyester diols may be produced, for example, from dicarboxylic acids having 2 to 12 carbon atoms, preferably 4 to 6 carbon atoms, and polyhydric alcohols. Contemplated dicarboxylic acids include for example: aliphatic dicarboxylic acids such as succinic acid, glutaric acid, adipic acid, suberic acid, azelaic acid and sebacic acid, or aromatic dicarboxylic acids such as phthalic acid, isophthalic acid and terephthalic acid. The dicarboxylic acids may be used individually or as mixtures, for example in the form of a succinic, glutaric and adipic acid mixture. To produce the polyester diols, it may in some cases be advantageous to employ not the dicarboxylic acids but rather the corresponding dicarboxylic acid derivatives such as carboxylic diesters having 1 to 4 carbon atoms in the alcohol radical, carboxylic anhydrides or carbonyl chlorides. Examples of polyhydric alcohols include glycols having 2 to 10, preferably 2 to 6, carbon atoms, for example ethylene glycol, diethylene glycol, 1,4-butanediol, 1,5-pentanediol, hexanediol, 1,10-decanediol, 2,2-dimethyl-1,3-propanediol, 1,3-propanediol or dipropylene glycol. Depending on the desired properties, the polyhydric alcohols may be used alone or in admixture with one another. Also suitable are esters of carbonic acid with the recited diols, especially those having 4 to 6 carbon atoms, such as 1,4-butanediol or 1,6-hexanediol, condensation products of ω-hydroxycarboxylic acids such as ω-hydroxycaproic acid, or polymerization products of lactones, for example optionally substituted ω-caprolactone. Preferably employed polyester diols are ethanediol polyadipates, 1,4-butanediol polyadipates, ethanediol 1,4-butanediol polyadipates, 1,6-hexanediol neopentyl glycol polyadipates, 1,6-hexanediol 1,4-butanediol polyadipates and polycaprolactones. The polyester diols preferably have number-average molecular weights Mn of 450 to 6000 g/mol and can be employed individually or in the form of mixtures with one another.

The chain extenders c) have on average 1.8 to 3.0 Zerewitinoff-active hydrogen atoms and have a molecular weight of 60 to 450 g/mol. This is to be understood as meaning compounds having amino groups, thiol groups or carboxyl groups, but also those having two to three, preferably two, hydroxyl groups.

Preferably employed chain extenders are aliphatic diols having 2 to 14 carbon atoms, for example ethanediol, 1,2-propanediol, 1,3-propanediol, 1,4-butanediol, 2,3-butanediol, 1,5-pentanediol, 1,6-hexanediol, diethylene glycol and dipropylene glycol. Also suitable, however, are diesters of terephthalic acid with glycols having 2 to 4 carbon atoms, for example terephthalic acid bis-ethylene glycol or terephthalic acid bis-butane-1,4-diol, hydroxyalkylene ethers of hydroquinone, for example 1,4-di(b-hydroxyethyl)hydroquinone, ethoxylated bisphenols, for example 1,4-di(b-hydroxyethyl)bisphenol A, (cyclo)aliphatic diamines, such as isophoronediamine, ethylenediamine, propylene-1,2-diamine, propylene-1,3-diamine, N-methylpropylene-1,3-diamine, N,N'-dimethylethylenediamine and aromatic diamines such as tolylene-2,4-diamine, tolylene-2,6-diamine, 3,5-diethyltolylene-2,4-diamine or 3,5-diethyltolylene-2,6-diamine or primary mono-, di-, tri- or tetraalkyl-substituted 4,4'-diaminodiphenylmethanes. Chain extenders employed with particular preference are ethanediol, 1,4-butanediol, 1,6-hexanediol, 1,4-di(β-hydroxyethyl) hydroquinone or 1,4-di(β-hydroxyethyl)bisphenol A. Mixtures of the abovementioned chain extenders may also be employed.

In addition, relatively small amounts of triols may also be added.

Compounds monofunctional toward isocyanates may be employed as so-called chain terminators under f) in proportions of up to 2% by weight based on TPU. Suitable examples include monoamines such as butyl- and dibutylamine, octylamine, stearylamine, N-methylstearylamine, pyrrolidine, piperidine or cyclohexylamine, monoalcohols such as butanol, 2-ethylhexanol, octanol, dodecanol, stearyl alcohol, the various amyl alcohols, cyclohexanol and ethylene glycol monomethyl ether.

The isocyanate-reactive substances should preferably be chosen such that their number-average functionality does not significantly exceed two if thermoplastically processible polyurethane elastomers are to be produced. If higher-functional compounds are used, the overall functionality should accordingly be lowered using compounds having a functionality of <2.

The relative amounts of isocyanate groups and isocyanate-reactive groups are preferably chosen such that the ratio is 0.9:1 to 1.2:1, preferably 0.95:1 to 1.1:1.

The thermoplastic polyurethane elastomers used in accordance with the invention may contain as auxiliary and/or additive substances not more than 50% by weight, based on the total amount of TPU, of customary auxiliary and additive substances. Typical auxiliary and additive substances are catalysts, antiblocking agents, inhibitors, pigments, colorants, flame retardants, stabilizers against aging and weathering effects and against hydrolysis, light, heat and discoloration, plasticizers, lubricants and demolding agents, fungistatic and bacteriostatic substances, reinforcers and inorganic and/or organic fillers and mixtures thereof.

Examples of additive substances are lubricants, such as fatty acid esters, metal soaps thereof, fatty acid amides, fatty acid ester amides and silicone compounds, and reinforcers, for example fibrous reinforcers, such as inorganic fibers, which are produced according to the prior art and may also be treated with a size. Further information about the recited auxiliary and additive substances may be found in the specialist literature, for example in the monograph by J. H. Saunders and K. C. Frisch "High Polymers", Volume XVI, Polyurethanes, Part 1 and 2, Interscience Publishers 1962/1964, in "Taschenbuch für Kunststoff-Additive" by R. Gächter and H. Müllner (Hamer Verlag Munich 1990) or in DE-A 29 01 774.

Suitable catalysts are the customary tertiary amines known from the prior art, for example triethylamine, dimethylcyclohexylamine, N-methylmorpholine, N,N'-dimethylpiperazine, 2-(dimethylaminoethoxy)ethanol, diazabicyclo[2.2.2]octane and the like and also in particular organic metal compounds such as titanate esters, iron compounds or tin compounds such as tin diacetate, tin dioctoate, tin dilaurate or the dialkyltin salts of aliphatic carboxylic acids such as dibutyltin diacetate or dibutyltin dilaurate or the like. Preferred catalysts are organic metal compounds, in particular titanate esters, iron compounds and tin compounds. The total amount of catalysts in the TPUs employed is generally about 0% to 5% by weight, preferably 0% to 2% by weight, based on the total amount of TPU.

In a further preferred embodiment the construction material comprises a thermoplastic polyurethane elastomer which has a melting range (DSC, differential scanning calorimetry; 2nd heating at a heating rate of 5 K/min) of ≥20° C. to ≤100° C. and a magnitude of complex viscosity

|η*| (determined by viscometry measurement in the melt with a plate/plate oscillation shear viscometer at 100° C. and an angular frequency of 1/s) of ≥10 Pas to ≤1 000 000 Pas.

This thermoplastic elastomer has a melting range of ≥20° C. to ≤100° C., preferably of ≥25° C. to ≤90° C. and more preferably of ≥30° C. to ≤80° C. In the DSC analysis for determination of the melting range, the material is subjected to the following temperature cycle: 1 minute at −60° C., then heating to 200° C. at 5 kelvin/minute, then cooling to −60° C. at 5 kelvin/minute, then 1 minute at −60° C., then heating to 200° C. at 5 kelvin/minute.

It is possible that the temperature interval between the start of the melting operation and the end of the melting operation as determinable according to the above DSC protocol is ≤20° C., preferably ≤10° C. and more preferably ≤5° C.

This thermoplastic elastomer further has a magnitude of complex viscosity |η*| (determined by viscometry measurement in the melt with a plate/plate oscillation viscometer according to ISO 6721-10:2015-04 at 100° C. and an angular frequency of 1/s) of ≥10 Pas to ≤1 000 000 Pas. |η*| is preferably ≥100 Pas to ≤500 000 Pas, more preferably ≥1000 Pas to ≤200 000 Pas.

The magnitude of complex viscosity |η*| describes the ratio of the viscoelastic moduli G' (storage modulus) and G'' (loss modulus) to the excitation frequency ω in a dynamic-mechanical material analysis:

$$|\eta^*| = \sqrt{\left[\left(\frac{G'}{\omega}\right)^2 + \left(\frac{G''}{\omega}\right)^2\right]} = \frac{|G^*|}{\omega}$$

In a further preferred embodiment, the construction material comprises a thermoplastic polyurethane elastomer obtainable from the reaction of a polyisocyanate component and a polyol component, said polyol component comprising a polyester polyol having a no-flow point (ASTM D5985) of ≥25° C.

Optionally also employable as chain extenders in the reaction to afford this polyurethane are dials in the molecular weight range from ≥62 to ≤600 g/mol.

This polyisocyanate component may comprise a symmetric polyisocyanate and/or an asymmetric polyisocyanate. Examples of symmetric polyisocyanates are 4,4'-MDI and HDI.

In the case of asymmetric polyisocyanates the steric environment of one NCO group in the molecule is different from the steric environment of a further NCO group. One isocyanate group then reacts more quickly with isocyanate-reactive groups, for example OH groups, while the remaining isocyanate group is less reactive. One consequence of the asymmetric construction of the polyisocyanate is that the polyurethanes formed with these polyisocyanates also have a less linear structure.

Examples of suitable nonsymmetric polyisocyanates are selected from the group comprising: 2,2,4-trimethylhexamethylene diisocyanate, ethylethylene diisocyanate, nonsymmetric isomers of dicyclohexylmethane diisocyanate (H$_{12}$-MDI), nonsymmetric isomers of 1,4-diisocyanatocyclohexane, nonsymmetric isomers of 1,3-diisocyanatocyclohexane, nonsymmetric isomers of 1,2-diisocyanatocyclohexane, nonsymmetric isomers of 1,3-diisocyanatocyclopentane, nonsymmetric isomers of 1,2-diisocyanatocyclopentane, nonsymmetric isomers of 1,2-diisocyanatocyclobutane, 1-isocyanatomethyl-3-isocyanato-1,5,5-trimethylcyclohexane (isophorone diisocyanate, IPDI), 1-methyl-2,4-diisocyanatocyclohexane, 1,6-diisocyanato-2,2,4-trimethylhexane, 1,6-diisocyanato-2,4,4-trimethylhexane, 5-isocyanato-1-(3-isocyanatoprop-1-yl)-1,3,3-trimethylcyclohexane, 5-isocyanato-1-(4-isocyanatobut-1-yl)-1,3,3-trimethylcyclohexane, 1-isocyanato-2-(3-isocyanatoprop-1-yl)cyclohexane, 1-isocyanato-2-(2-isocyanatoeth-1-yl)cyclohexane, 2-heptyl-3,4-bis(9-isocyanatononyl)-1-pentylcyclohexane, norbornane diisocyanatomethyl, 2,4'-diphenylmethane diisocyanate (MDI), 2,4- and 2,6-tolylene diisocyanate (TDI), derivatives of the diisocyanates listed, especially dimerized or trimerized types, or a combination of at least two of these.

Preference is given to 4,4'-MDI or a mixture containing IPDI and HDI and/or PDI as the polyisocyanate component.

This polyol component comprises a polyester polyol having a no-flow point (ASTM D5985) of ≥25° C., preferably ≥35° C., more preferably ≥35° C. to ≤55° C. To determine the no-flow point a test vessel containing the sample is set into slow rotation (0.1 rpm). A flexibly mounted measuring head is immersed in the sample and, on attainment of the no-flow point, is moved away from its position as a result of the abrupt increase in viscosity; the resulting tipping motion triggers a sensor.

Examples of polyester polyols which can have such a no-flow point are reaction products of phthalic acid, phthalic anhydride or symmetric α,ω-C$_4$- to C$_{10}$-dicarboxylic acids with one or more C$_2$- to C$_{10}$-diols. They preferably have a number-average molecular weight M$_n$ of ≥400 g/mol to ≤6000 g/mol. Suitable dials are especially monoethylene glycol, 1,4-butanediol, 1,6-hexanediol and neopentyl glycol.

Preferred polyester polyols are specified hereinbelow by reporting their acid and diol components: adipic acid+monoethylene glycol; adipic acid+monoethylene glycol+1,4-butanediol; adipic acid+1,4-butanediol; adipic acid+1,6-hexanediol+neopentyl glycol; adipic acid+1,6-hexanediol; adipic acid+1,4-butanediol+1,6-hexanediol; phthalic acid (anhydride)+monoethylene glycol+trimethylolpropane; phthalic acid(anhydride)+monoethylene glycol. Preferred polyurethanes are obtained from a mixture containing IPDI and HDI as the polyisocyanate component and a polyol component containing an abovementioned preferred polyester polyol. Particular preference is given to the combination of a mixture comprising IPDI and HDI as polyisocyanate component with a polyester polyol formed from adipic acid+1,4-butanediol+1,6-hexanediol for formation of the polyurethanes.

It is further preferred when these polyester polyols have an OH number (DIN 53240) of ≥25 to ≤170 mg KOH/g and/or a viscosity (75° C., DIN 51550) of ≥50 to ≤5000 mPas.

One example is a polyurethane obtainable from the reaction of a polyisocyanate component and a polyol component, wherein the polyisocyanate component comprises an HDI and IPDI and wherein the polyol component comprises a polyester polyol which is obtainable from the reaction of a reaction mixture comprising adipic acid and also 1,6-hexanediol and 1,4-butanediol with a molar ratio of these diols of ≥1:4 to ≤4:1 and which has a number-average molecular weight M$_n$ (GPC, against polystyrene standards) of ≥4000 g/mol to ≤6000 g/mol. Such a polyurethane may have a magnitude of complex viscosity |η*| (determined by viscometry measurement in the melt with a plate/plate oscillation viscometer according to ISO 6721-10:2015-09 at 100° C. and an angular frequency of 1/s) of ≥4000 Pas to ≤160 000 Pas.

A further example of a suitable polyurethane is:
1. Substantially linear polyester polyurethanes having terminal hydroxyl groups as described in EP 0192946 A1, produced by reaction of
   a) polyester diols having a molecular weight above 600 and optionally
   b) diols in the molecular weight range of 62 to 600 g/mol as chain extenders with
   c) aliphatic diisocyanates,
   while observing an equivalent ratio of hydroxyl groups of components a) and b) to isocyanate groups of component c) of 1:0.9 to 1:0.999, wherein component a) consists to an extent of at least 80% by weight of polyester diols in the molecular weight range of 4000 to 6000 based on (i) adipic acid and (ii) mixtures of 1,4-dihydroxybutane and 1,6-dihydroxyhexane in a molar ratio of the diols of 4:1 to 1:4.

In the polyester polyurethanes recited under 1. it is preferable when component a) consists to an extent of 100% of a polyester diol in the molecular weight range of 4000 to 6000 wherein the production thereof has employed as the diol mixture a mixture of 1,4-dihydroxybutane and 1,6-dihydroxyhexane in a molar ratio of 7:3 to 1:2.

In the polyester polyurethanes recited under 1. it is further preferable when component c) comprises IPDI and also HDI.

In the polyester polyurethanes recited under 1. it is further preferable when the production thereof comprised co-use as component b) of alkanediols selected from the group consisting of 1,2-dihydroxyethane, 1,3-dihydroxypropane, 1,4-dihydroxybutane, 1,5-dihydroxypentane, 1,6-dihydroxyhexane or a combination of at least two of these in an amount of up to 200 hydroxyl equivalent percent based on component a).

It is further possible that after heating to 100° C. and cooling to 20° C. at a cooling rate of 4° C./min over a temperature interval from 25° C. to 40° C. for ≥1 minute (preferably ≥1 minute to ≤30 minutes, more preferably ≥10 minutes to ≤15 minutes) the thermoplastic elastomer has a storage modulus G' (determined at the respectively prevailing temperature with a plate/plate oscillation viscometer according to ISO 6721-10:2015-09 at an angular frequency of 1/s) of ≥100 kPa to ≤1 MPa and after cooling to 20° C. and storage for 20 minutes has a storage modulus G' (determined at 20° C. with a plate/plate oscillation viscometer according to ISO 6721-10:2015-09 at an angular frequency of 1/s) of ≥10 MPa.

The following combination is preferred in the process according to the invention:
   powder sintering process for producing the article;
   construction material containing polyurethane obtainable from the reaction of a polyisocyanate component and a polyol component, wherein the polyisocyanate component comprises an HDI and IPDI and wherein the polyol component comprises a polyesterpolyol which is obtainable from the reaction of a reaction mixture comprising adipic acid and also hexane-1,6-diol and butane-1,4-diol with a molar ratio of these dials of ≥1:4 to ≤4:1 and which has a number-average molecular weight $M_n$ (GPC, against polystyrene standards) of ≥4000 g/mol to ≤6000 g/mol.
   anionic aliphatic polyesterpolyurethane dispersion.

The following combination is likewise preferred in the process according to the invention:
   powder sintering process for producing the article;
   construction material containing polyurethane obtainable from the reaction of a polyisocyanate component and a polyol component, wherein the polyisocyanate component comprises an MDI (preferably 4,4'-MDI) and wherein the polyol component comprises a polyesterpolyol which is obtainable from the reaction of a reaction mixture comprising adipic acid and also hexane-1,6-diol and butane-1,4-diol with a molar ratio of these diols of ≥1:4 to ≤4:1 and which has a number-average molecular weight $M_n$ (GPC, against polystyrene standards) of ≥4000 g/mol to ≤6000 g/mol.
   anionic aliphatic polyesterpolyurethane dispersion.

The present invention further relates to an at least partially coated article obtained by a process according to the invention.

The invention is more particularly elucidated by the examples which follow without, however, being limited thereto.

EXAMPLES 1 to 4: PRODUCTION OF POLYURETHANE DISPERSIONS

The production of polyurethane dispersions employable according to the invention is described hereinbelow without, however, being limited thereto. Unless otherwise stated all percentages are based on weight. Unless otherwise stated all analytical measurements relate to temperatures of 23° C. The solids contents were determined according to DIN-EN ISO 3251. Unless explicitly otherwise stated NCO contents were determined by volumetric means according to DIN-EN ISO 11909. The check for free NCO groups was conducted by means of IR spectroscopy (band at 2260 cm$^{-1}$). The viscosities reported were determined by means of rotary viscometry to DIN 53019 at 23° C. with a rotary viscometer from Anton Paar Germany GmbH, Ostfildern, DE. Determination of the average particle sizes (number-average is reported) of the polyurethane dispersions was carried out by laser correlation spectroscopy (instrument: Malvern Zetasizer 1000, Malver Inst. Limited).

Substances and abbreviations used:
Diaminosulfonate: NH$_2$—CH$_2$CH$_2$—NH—CH$_2$CH$_2$—SO$_3$Na (45% in water)
Desmophen 2020/C2200: Polycarbonate polyol, OH number 56 mg KOH/g, number-average molecular weight 2000 g/mol (Covestro AG, Leverkusen, DE)
PolyTHF 2000: polytetramethylene glycol polyol, OH number 56 mg KOH/g, number-average molecular weight 2000 g/mol (BASF AG, Ludwigshafen, DE)
PolyTHF 1000: polytetramethylene glycol polyol, OH number 112 mg KOH/g, number-average molecular weight 1000 g/mol (BASF AG, Ludwigshafen, DE)
Polyether LB 25: monofunctional ethylene oxide-/propylene oxide-based polyether, number-average molecular weight 2250 g/mol, OH number 25 mg KOH/g (Covestro AG, Leverkusen, DE)

Example 1

987.0 g of PolyTHF 2000, 375.4 g of PolyTHF 1000, 761.3 g of Desmophen C2200 and 44.3 g of polyether LB 25 were heated to 70° C. in a standard stirring apparatus. Subsequently, at 70° C., a mixture of 237.0 g of hexamethylene diisocyanate and 313.2 g of isophorone diisocyanate was added over 5 min and the mixture was stirred at 120° C. until the theoretical NCO value had been achieved. The finished prepolymer was dissolved with 4830 g of acetone and cooled to 50° C. before a solution of 25.1 g of ethylenediamine, 116.5 g of isophoronediamine, 61.7 g of diaminosulfonate and 1030 g of water was added over 10 min. The after stirring time was 10 min. The mixture was then dispersed by addition of 1250 g of water. This was followed by removal of the solvent by distillation under vacuum. The residual content of acetone was below 1% by weight based on the finished dispersion.

The obtained white dispersion had the following properties:
Solids content: 61%
Particle size (LCS): 312 nm
Viscosity (viscometer, 23° C.): 241 mPas
pH (23° C.): 6.02

Example 2

450 g of PolyTHF 1000 and 2100 g of PolyTHF 2000 were heated to 70° C. Subsequently, at 70° C., a mixture of 225.8 g of hexamethylene diisocyanate and 298.4 g of isophorone diisocyanate was added over 5 min and the mixture was stirred at 100-115° C. until the NCO content had fallen below the theoretical value. The finished prepolymer was dissolved with 5460 g of acetone at 50° C. before a solution of 29.5 g of ethylenediamine, 143.2 g of diaminosulfonate and 610 g of water was added over 10 min. The after stirring time was 15 min. The mixture was then dispersed over 10 min by addition of 1880 g of water. This was followed by removal of the solvent by distillation under reduced pressure to obtain a storage-stable dispersion. The residual content of acetone was below 1% by weight based on the finished dispersion.
Solids content: 56%
Particle size (LCS): 276 nm
Viscosity: 1000 mPas
pH (23° C.): 7.15

Example 3

1649.0 g of a polyester composed of adipic acid, hexanediol and neopentyl glycol having an average molecular weight of 1700 g/mol were heated to 65° C. Subsequently, at 70° C., 291.7 g of hexamethylene diisocyanate were added over 5 min and the mixture was stirred at 100-115° C. until the NCO content had fallen below the theoretical value. The finished prepolymer was dissolved with 3450 g of acetone at 50° C. and then a solution of 16.8 g of ethylenediamine, 109.7 g of diaminosulfonate and 425 g of water was metered in within 3 min. The after stirring time was 15 min. The mixture was then dispersed over 10 min by addition of 1880 g of water. This was followed by removal of the solvent by distillation under reduced pressure to obtain a storage-stable dispersion.
Solids content: 42%
Particle size (LCS): 168 nm
Viscosity: 425 mPas
pH: 7.07

Example 4

82.5 g of PolyTHF 1000, 308 g of PolyTHF 2000 and 10.0 g of 2-ethylhexanol were heated to 70° C. Subsequently, at 70° C., a mixture of 41.4 g of hexamethylene diisocyanate and 54.7 g of isophorone diisocyanate was added over 5 min and the mixture was stirred at 110-125° C. until the NCO content had fallen below the theoretical value. The finished prepolymer was dissolved with 880 g of acetone at 50° C. before a solution of 3.8 g of ethylenediamine, 4.6 g of isophoronediamine, 26.3 g of diaminosulfonate and 138 g of water was added over 10 min. The after stirring time was 15 min. The mixture was then dispersed over 10 min by addition of 364 g of water. This was followed by removal of the solvent by distillation under reduced pressure to obtain a storage-stable dispersion.
Solids content: 49%
Particle size (LCS): 181 nm
Viscosity: 1300 mPas
pH: 7.22

Example 5: Coatings with Dispersions

Employed as the construction material was a pulverulent, ester-based thermoplastic polyurethane such as was described in example 1 of WO 2015/197515 A1. This was synthesized from 1 mol of polyester diol having a number-average molecular weight of about 900 g/mol based on about 56.7% by weight of adipic acid and about 43.3% by weight of 1,4-butanediol and about 1.45 mol of 1,4-butanediol, about 0.22 mol of 1,6-hexanediol, about 2.67 mol of technical 4,4'-diphenylmethane diisocyanate (MDI) comprising >98% by weight of 4,4'-MDI, 0.05% by weight of Irganox 1010 (pentaerythritoltetrakis (3-(3,5-di-tert-butyl-4-hydroxyphenyl)propionate) from BASF SE), 1.1% by weight of Licowax E (montanic ester from Clariant) and 250 ppm of tin dioctooate by the known static mixer-extruder process. The obtained TPU had the following properties: melting range (DSC, differential scanning calorimetry; second heating at a heating rate of 5 K/min) of ≥20° C. to ≤200° C., Shore A hardness according to DIN ISO 7619-1 of ≥40 A to ≤85 D, a melt volume rate (MVR) according to ISO 1133 at a temperature T of 5 to 15 cm$^3$/10 min and a change in the melt volume rate (10 kg) for an increase in this temperature T by 20° C. of ≤90 cm$^3$/10 min.

This construction material was used to produce an S2 test specimen by means of a powder laser sintering process (SLS).

The obtained S2 test specimen was immersed in an aqueous polyurethane dispersion known as Impranil DLN W50 (Covestro AG, Leverkusen, DE), of an anionic aliphatic polyester polyurethane dispersion, for 10 min and subsequently dried to constant weight at room temperature.

Before and after coating with the polyurethane dispersion the test specimen was evaluated in respect of its haptic properties on a scale of 1 to 5 points, wherein a score of 1 point denotes very unpleasant haptic properties and a value of 5 points denotes very pleasant haptic properties. The test specimen was given an evaluation of 2 points before coating and 4 points after coating.

The production of further test specimens was carried out with a Snowwhite SLS powder SLS apparatus from Sharebot using the following apparatus parameters: Temperature of powder surface: 80° C., scan rate: 300 mm/s, laser output: 60%, "Hatch Distance": 0.2 mm, layer height: 0.15 mm. The powder employed was the ester-based thermoplastic polyurethane powder Luvosint X92A-1 WT from Lehmann & Voss. According to the data in the datasheet this material had a glass transition temperature (ISO 6721-1) of −13.6° C., a melt volume rate MVR 190° C./2.16 kg (ISO 1133) of 18 cm$^3$/min and a Shore A hardness (ISO 868) of a laser-sintered component of 88.

The thus-obtained test specimens having a porosity Φ of about 0.3 were immersed in various aqueous dispersions at room temperature for 10 minutes, allowed to drip-dry for 15 minutes, and then heat treated at 70° C. for 15 minutes and at 100° C. for a further 3 minutes in a circulating air drying cabinet before, after a further three days of storage at room temperature, being tested in the tensile test according to DIN 53504. This comprised testing the elastic modulus at 50% elongation, the breaking elongation and the breaking stress.

It is very readily apparent from the results described hereinbelow that under comparable conditions the inventive combination of polyurethane-based sintered products with polyurethane-containing and/or isocyanate-containing infiltrants achieves markedly higher moduli and tensile strengths compared to untreated specimens. It is thought that this evidences the particularly good interaction between the polyurethane construction material and polyurethane and/or isocyanate-based infiltrants.

The inventive examples are marked * while the comparative examples are marked (V). 3 hours before infiltration all dispersions were admixed with stirring with 0.3 parts of BYK 331 (a silicone-containing surface additive for solventless and solvent-containing industrial and automotive lacquers and printing inks obtainable from Altana Group).

| Sample no. | Description |
| --- | --- |
| 1 (V) | sintered bar as starting product, heat-treated as described |
| 2 (V) | as per sample no. 1, additionally infiltrated with water |
| 3 (V) | as per sample no. 1, additionally infiltrated with Acronal A 310 S (acrylate copolymer dispersion, 50% solids; BASF SE) |
| 4* | as per sample no. 1, additionally infiltrated with Dispercoll U54 (polyurethane dispersion, 50% solids; Covestro AG) |
| 5* | as per sample no. 1, additionally infiltrated with Bayhydur 3100, 50% in water (hydrophilized isocyanate; Covestro AG) |
| 6* | as per sample no. 1, additionally infiltrated with a mixture of Baydrol UH 2557 (polyurethane dispersion, 30% solids; Covestro AG) and 10% by weight of Bayhydur 3100 |

The mass increases of the samples after infiltrations were:

| Sample no. | Initial weight [g] | Increase [g] | Increase [%] |
| --- | --- | --- | --- |
| 1 (V) | 1.018 | 0 | 0 |
| 2 (V) | 1.028 | 0 | 0 |
| 3 (V) | 1.030 | 0.049 | 4.72 |
| 4* | 1.061 | 0.054 | 5.09 |
| 5* | 1.084 | 0.087 | 8.03 |
| 6* | 1.046 | 0.053 | 5.07 |

The results of the mechanical tests were as follows:

| Sample no. | Elastic modulus at 50% elongation [N/mm$^2$] | Breaking stress [N/mm$^2$] | Breaking elongation [%] |
| --- | --- | --- | --- |
| 1 (V) | 2.829 | 3.876 | 132 |
| 2 (V) | 2.927 | 4.242 | 147 |
| 3 (V) | 2.780 | 4.138 | 160 |
| 4* | 3.460 | 6.290 | 221 |
| 5* | 3.334 | 6.386 | 236 |
| 6* | 3.450 | 5.013 | 183 |

Further tests were performed on printed S2 test specimens in the form of tensile bars. These were printed in the FDM process with an ABS material (100180, ABS plastic 2, 1 kg 1.75 mm—natural) from German Reprap.

The printer employed was a Prusa i3 MK2 with a 0.4 mm die and a temperature of 255° C. The printing parameters were: extrusion die diameter 0.4 mm, layer height 0.2 mm, printing rate 40 mm/s, infill 100%, extrusion temperature 255° C., printing bed temperature 100° C.

The thus-obtained ABS test specimens in S2 rod form were immersed in various aqueous dispersions at room temperature for 10 minutes, allowed to drip-dry for 15 minutes, and then heat treated at 70° C. for 15 minutes and at 100° C. for a further 3 minutes in a circulating air drying cabinet before, after a further three days of storage at room temperature, being tested in the tensile test according to DIN 53504. This comprised testing the elastic modulus at 50% elongation, the breaking elongation and the breaking stress.

Before and after coating with the polyurethane dispersion the test specimen was evaluated in respect of its haptic properties on a scale of 1 to 5 points, wherein a score of 1 point denotes very unpleasant haptic properties and a value of 5 points denotes very pleasant haptic properties. The test specimen was given an evaluation of 3 points before coating and 4 points after coating.

| Sample no. | Description |
| --- | --- |
| 7 (V) | printed bar as starting product, heat-treated as described |
| 8 (V) | as per sample no. 7 (V), additionally infiltrated with Dispercoll U54 (polyurethane dispersion, 50% solids; Covestro AG) |
| 9 (V) | as per sample no. 7 (V), additionally infiltrated with Acronal A 310 S (acrylate copolymer dispersion, 50% solids: BASF SE) |
| 10 (V) | as per sample 7(V), additionally Infiltrated with Bayhydur 3100, 50% in water (hydrophilized isocyanate; Covestro AG) |

The mass increases of the samples after infiltrations were:

| Sample no. | Initial weight [g] | Weight after increase [g] | Increase [%] |
| --- | --- | --- | --- |
| 7 (V) | 1.19 | 0 | 0 |
| 8 (V) | 1.199 | 1.2185 | 1.62 |
| 9 (V) | 1.19047 | 1.2135 | 1.93 |
| 10 (V) | 1.1995 | 1.2235 | 2.00 |

The results of the mechanical tests were as follows:

| Sample no. | Elastic modulus [N/mm$^2$] | Breaking stress [N/mm$^2$] | Elongation at break [%] |
| --- | --- | --- | --- |
| 7 (V) | 1580 | 33 | 4.4 |
| 8 (V) | 1600 | 34 | 2.7 |
| 9 (V) | 1580 | 36 | 4.8 |
| 10 (V) | 1550 | 36 | 3.7 |

It is clearly apparent that the coating with inventive coatings of noninventive materials such as ABS plastic in the form of S2 test bars produced by the additive manufacturing process FDM as described above does as expected generate a noticeable improvement in haptic surface properties but has no significant influence on the mechanical properties of the components and thus exhibits no improvement of mechanical properties.

The invention claimed is:

1. A process for producing an at least partially coated article comprising:
   producing the article using an additive manufacturing process from a construction material comprising a thermoplastic polyurethane material; and
   at least partially contacting the article with a preparation selected from:
      aqueous polyurethane dispersion,
      aqueous dispersion of an OH-containing polymer, wherein this dispersion further contains an NCO-containing compound, aqueous preparation of an NCO-containing compound, wherein this preparation contains no OH-containing polymers, or a combination of at least two of these, wherein the residual content of organic solvents in the preparation is less than 2% by weight relative to the total preparation; and wherein regions of the article contacted by the preparation have an elastic modulus at 50% elongation determined according to DIN 53504 that is 5% greater than an elastic modulus at 50% elongation of regions of the article not contacted by the preparation.

2. The process as claimed in claim 1, wherein the aqueous polyurethane dispersion is obtained when A) isocyanate-functional prepolymers are produced from
  A1) organic polyisocyanates,
  A2) polymeric polyols having number-average molecular weights of 400 to 8000 g/mol and OH functionalities of 1.5 to 6 and
  A3) optionally hydroxyl-functional compounds having molecular weights of 62 to 399 g/mol and optionally containing olefinically unsaturated compounds and
  A4) optionally isocyanate-reactive, anionic or potentially anionic and/or optionally nonionic hydrophilization agents, and B) the free NCO groups thereof are then wholly or partially reacted
  B1) optionally with amino-functional compounds having molecular weights of 32 to 400 g/mol and
  B2) with amino-functional, anionic or potentially anionic hydrophilization agents by chain extension and the prepolymers are dispersed in water before, during or after step B).

3. The process as claimed in claim 1, wherein the aqueous dispersion of an OH-containing polymer which further contains an NCO-containing compound comprises the components:

A) one or more compounds comprising uncrosslinked polymer-bonded (meth)acrylates having an OH number of 20 to 300 mg KOH/g of substance and/or B) optionally compounds distinct from A) having at least one isocyanate-reactive group and at least one radiation-curable double bond, C) optionally one or more compounds having at least one isocyanate-reactive group but no radiation-curable double bonds, D) one or more compounds having at least one isocyanate-reactive group and additionally groups which are nonionic, anionic or capable of forming anionic groups and have a dispersing effect for the polyurethane acrylates or D') one or more compounds having at least one isocyanate-reactive group and additionally groups which are cationic or capable of forming cationic groups and have a dispersing effect for the polyurethane acrylates, E) one or more organic compounds having 2 or more isocyanate groups, F) optionally neutralizing amines in combination with compounds D) or F') neutralization acids F') in combination with compounds D'), G) optionally urethanization catalysts and optionally further assistant and additive substances.

4. The process as claimed in claim 1, wherein the NCO-containing compound in the aqueous preparation of the NCO-containing compound without OH-containing polymers in the preparation is a compound based on aliphatic, cycloaliphatic, araliphatic and/or aromatic diisocyanates having:

a) an average isocyanate functionality of at least 2.0
b) a content of isocyanate groups (calculated as NCO; molecular weight=42) of 5.0% to 25.0% by weight and
c) an anionically and/or nonionically hydrophilizing component.

5. The process as claimed in claim 1, sections of the article that are contacted with the preparation have a porosity $\Phi$ of $\geq 0.01$ to $\leq 0.6$ and the porosity $\Phi$ is expressed as:

$$\Phi = 1 - (\rho/\rho_0)$$

wherein $\rho$ represents the density of the volume assigned to the sections of the article that are contacted with the preparation and $\rho_0$ represents the true density of the construction material.

6. The process as claimed in claim 1, wherein the additive manufacturing process comprises:

applying a layer of particles comprising the construction material onto a target surface;

energizing a selected portion of the layer corresponding to a cross section of the article to join the particles in the selected portion;

repeating the steps of applying and energizing for a plurality of layers so that the joined portions of the adjacent layers become joined to form the article.

7. The process as claimed in claim 6, wherein the energizing of a selected portion of the layer comprises:

irradiating a selected portion of the layer corresponding to a cross section of the article with an energy beam to join the particles in the selected portion.

8. The process as claimed in claim 6, wherein the energizing of a selected portion of the layer comprises:

applying a liquid to a selected portion of the layer corresponding to a cross section of the article, wherein the liquid increases the absorption of energy in the regions of the layer contacted by it relative to the regions not contacted by it;

irradiating the layer so that the particles in regions of the layer contacted by the liquid are joined to one another and the particles in regions of the layer not contacted by the liquid are not joined to one another.

9. The process as claimed in claim 1, wherein the additive manufacturing process comprises:

applying a filament of an at least partially molten construction material onto a carrier to obtain a layer of the construction material corresponding to a first selected cross section of the article;

applying a filament of the at least partially molten construction material onto a previously applied layer of the construction material to obtain a further layer of the construction material which corresponds to a further selected cross section of the article and which is joined to the previously applied layer;

repeating the step of applying a filament of the at least partially molten construction material onto a previously applied layer of the construction material until the article has been formed.

10. The process as claimed in claim 1, wherein the construction material comprises a thermoplastic polyurethane elastomer having a melting range (DSC, differential scanning calorimetry; second heating at a heating rate of 5 K/min) of $\geq 20°$ C. to $\leq 240°$ C., a Shore hardness according to DIN ISO 7619-1 of $\geq 40$ A to $\leq 85$ D.

11. The process as claimed in claim 1, wherein the construction material comprises a thermoplastic polyurethane elastomer having a melting range (DSC, differential scanning calorimetry; second heating at a heating rate of 5 K/min) of $\geq 20°$ C. to $\leq 240°$ C., a Shore A hardness according to DIN ISO 7619-1 of $\geq 40$ A to $\leq 85$ D, and a melt volume rate (MVR) according to ISO 1133 (10 kg) at a temperature T of 5 to 15 cm$^3$/10 min and exhibiting a change in the melt volume rate (10 kg) at an increase of temperature T by 20° C. of $\leq 90$ cm$^3$/10 min.

12. The process as claimed in claim 1, wherein the construction material comprises a thermoplastic polyurethane elastomer obtained from the reaction of the following components:

a) at least one organic diisocyanate b) at least one compound having isocyanate-reactive groups and having a number-average molecular weight ($M_n$) of $\geq 500$ g/mol to $\leq 6000$ g/mol and a number-average functionality of the sum total of the components b) of $\geq 1.8$ to $\leq 2.5$ c) at least one chain extender having a molecular weight (Mn) of 60-450 g/mol and a number-average functionality of the sum total of the chain extenders c) of 1.8 to 2.5.

13. The process as claimed in claim 1, wherein the construction material comprises a thermoplastic polyurethane elastomer having a melting range (DSC, differential scanning calorimetry; $2^{nd}$ heating at a heating rate of 5 K/min) of $\geq 20°$ C. to $\leq 100°$ C. and a magnitude of complex viscosity $|\eta^*|$ (determined by viscometry measurement in the melt with a plate/plate oscillation shear viscometer at 100° C. and an angular frequency of 1/s) of $\geq 10$ Pas to $\leq 1\,000\,000$ Pas.

14. The process as claimed in claim 1, wherein the construction material comprises a thermoplastic polyurethane elastomer obtained from the reaction of a polyisocyanate component and a polyol component, wherein the polyol component comprises a polyester polyol having a no-flow point (ASTM D5985) of $\geq 25°$ C.

15. The process as claimed in claim 1, wherein the residual content of organic solvents in the preparation is less than 1% by weight relative to the total preparation.

* * * * *